US012682828B2

(12) United States Patent
Kim et al.

(10) Patent No.: US 12,682,828 B2
(45) **Date of Patent: *Jul. 14, 2026**

(54) PIXEL AND DISPLAY DEVICE HAVING THE SAME

(71) Applicant: Samsung Display Co., LTD., Yongin-si (KR)

(72) Inventors: Na Young Kim, Yongin-si (KR); Dong Hwi Kim, Yongin-si (KR); Jin Jeon, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,263

(22) Filed: May 10, 2023

(65) Prior Publication Data

US 2023/0282161 A1 Sep. 7, 2023

Related U.S. Application Data

(63) Continuation of application No. 17/740,965, filed on May 10, 2022, now Pat. No. 11,682,344, which is a (Continued)

(30) Foreign Application Priority Data

Oct. 25, 2019 (KR) ........................ 10-2019-0133995

(51) Int. Cl.
*G09G 3/32* (2016.01)
*G09G 3/3225* (2016.01)

(Continued)

(52) U.S. Cl.
CPC ............. *G09G 3/32* (2013.01); *G09G 3/3225* (2013.01); *G09G 3/3233* (2013.01);

(Continued)

(58) Field of Classification Search
CPC ......... G09G 3/3233; G09G 2300/0819; G09G 3/3266; G09G 3/325; G09G 3/3258;

(Continued)

(56) References Cited

U.S. PATENT DOCUMENTS 7,414,599 B2 8/2008 Chung et al.
8,237,637 B2 8/2012 Chung (Continued)

FOREIGN PATENT DOCUMENTS

CN 102338828 2/2012
CN 107256695 11/2019

(Continued)

OTHER PUBLICATIONS

Korean Notice of Allowance for Korean Patent Application No. 10-2019-0133995, dated Jul. 19, 2024.

(Continued)

*Primary Examiner* — Dismery Mercedes

(74) *Attorney, Agent, or Firm* — Harness, Dickey & Pierce, P.L.C.

(57) ABSTRACT

A pixel for a display device includes a light-emitting element, a first transistor including a first electrode electrically connected to a first node and controlling a driving current, a second transistor electrically connected between a data line and the first node and being turned on in response to a first scan signal supplied through a first scan line, a third transistor electrically connected between the second node and a third node electrically connected to a second electrode of the first transistor and being turned on in response to the first scan signal, and a fourth transistor being turned on in response to a second scan signal supplied through a second scan line, and applying a bias voltage to the first transistor. The fourth transistor is turned on at a first frequency. The (Continued)

second and third transistors are turned on at a second frequency different from the first frequency.

20 Claims, 25 Drawing Sheets

Related U.S. Application Data continuation of application No. 16/881,738, filed on May 22, 2020, now Pat. No. 11,348,512.

(51) Int. Cl.
*G09G 3/3233* (2016.01)
*G09G 3/3258* (2016.01)
*G09G 3/3266* (2016.01)

(52) U.S. Cl.
CPC ......... *G09G 3/3258* (2013.01); *G09G 3/3266* (2013.01); *G09G 2310/0262* (2013.01); *G09G 2310/0278* (2013.01); *G09G 2320/0247* (2013.01); *G09G 2330/021* (2013.01); *G09G 2330/028* (2013.01)

(58) Field of Classification Search
CPC .. G09G 3/3225; G09G 3/3208; G09G 3/3291; G09G 2310/0267; G09G 2310/0264; G09G 2310/0278; G09G 2330/028; G09G 2320/0233; G09G 2320/0247; G09G 2010/08; G09G 3/32; G09G 3/3241
See application file for complete search history.

(56) References Cited

U.S. PATENT DOCUMENTS 8,994,619 B2 3/2015 Jeong
9,024,934 B2 5/2015 Park et al.
9,324,266 B2 4/2016 Hwang et al.
9,823,729 B2 11/2017 An et al.
10,062,321 B2 8/2018 Na et al.
10,255,855 B2 4/2019 Park et al.
10,424,244 B2 9/2019 Le et al.
10,529,283 B2 1/2020 Chai et al.
10,586,496 B2 3/2020 Kim et al.
10,672,353 B2 6/2020 Kim et al.
10,700,146 B2 6/2020 Chai et al.
10,762,841 B2 9/2020 Ji et al.
10,909,918 B2 2/2021 Kim et al.
10,957,249 B2 3/2021 Lee
11,056,049 B2 7/2021 Kim et al.
11,145,254 B2 10/2021 Nam
11,158,261 B2 10/2021 Kim et al.
11,170,704 B2 11/2021 An et al.
11,348,512 B2 * 5/2022 Kim ..................... G09G 3/3233
11,373,588 B2 6/2022 Kim et al.
11,682,344 B2 * 6/2023 Kim ..................... G09G 3/3233 345/71
2005/0052377 A1 * 3/2005 Hsueh .................... H05B 45/60 345/82
2014/0028648 A1 * 1/2014 Park ..................... G09G 3/3233 345/76
2014/0198136 A1 * 7/2014 Lee ...................... G09G 3/3266 345/82
2015/0243203 A1 8/2015 Kim et al.
2015/0364083 A1 12/2015 Jeon
2016/0019856 A1 1/2016 Tanaka et al.
2016/0124491 A1 * 5/2016 An ........................ G06F 1/3265 713/323
2017/0018220 A1 1/2017 Takahara
2017/0061875 A1 * 3/2017 Cho ..................... G09G 3/3233
2017/0116922 A1 * 4/2017 Jung .................... G09G 3/3258
2017/0124941 A1 * 5/2017 Na ....................... G09G 3/2092
2017/0263187 A1 9/2017 Zhu et al.
2017/0270869 A1 * 9/2017 Ma ....................... G09G 3/3266
2017/0365218 A1 * 12/2017 Jeong ................... H10K 59/123
2018/0006105 A1 * 1/2018 Kim ................... H10K 59/1213
2018/0061352 A1 3/2018 Kim et al.
2018/0075801 A1 3/2018 Le et al.
2018/0158407 A1 6/2018 Chai et al.
2018/0166516 A1 6/2018 Chai et al.
2018/0197483 A1 7/2018 Tanikame et al.
2018/0286308 A1 * 10/2018 Yoon .................... H10K 59/131
2018/0293939 A1 * 10/2018 Kim ..................... G09G 3/3233
2018/0293944 A1 10/2018 Kim et al.
2019/0096330 A1 3/2019 Kim et al.
2019/0189057 A1 * 6/2019 Dong ................... G09G 3/3233
2019/0266941 A1 * 8/2019 Pyo ...................... G09G 3/3258
2019/0295468 A1 * 9/2019 Ji ......................... G09G 3/3291
2019/0385530 A1 * 12/2019 Gao ..................... G09G 3/3258
2020/0219447 A1 7/2020 Talebzadeh et al.
2020/0226978 A1 * 7/2020 Lin .................... H10K 59/1213
2020/0394961 A1 12/2020 Kim et al.
2021/0027696 A1 1/2021 Kim et al.
2021/0327344 A1 * 10/2021 Dong ................... G09G 3/3233
2022/0230586 A1 7/2022 Jeong

FOREIGN PATENT DOCUMENTS

KR 10-2005-0005646 1/2005
KR 10-0500187 7/2005
KR 10-2009-0053266 5/2009
KR 10-2012-0065137 6/2012
KR 10-2014-0013586 2/2014
KR 10-2017-0049787 5/2017
KR 10-2018-0025399 3/2018
KR 10-2018-0067768 6/2018
KR 10-2018-0114981 10/2018
KR 10-2020-0142646 12/2020
KR 10-2021-0013509 2/2021

OTHER PUBLICATIONS

Chinese Office Action dated Feb. 25, 2025, in Chinese Patent Application No. 202010878943.X.

* cited by examiner

PIXEL AND DISPLAY DEVICE HAVING THE SAME

CROSS-REFERENCE TO RELATED APPLICATION(S)

This is a continuation application of U.S. patent application Ser. No. 17/740,965, filed May 10, 2022, now U.S. Pat. No. 11,682,344, issued Jun. 20, 2023, the disclosure of which is incorporated herein by reference in its entirety. U.S. patent application Ser. No. 17/740,965 is a continuation application of U.S. patent application Ser. No. 16/881,738, filed May 22, 2020, now U.S. Pat. No. 11,348,512, issued May 31, 2022, the disclosure of which is incorporated herein by reference in its entirety. U.S. patent application Ser. No. 16/881,738 claims priority to and benefit of Korean Patent Application No. 10-2019-0133995 under 35 U.S.C. § 119, filed on Oct. 25, 2019, in the Korean Intellectual Property Office, the entire contents of which are incorporated herein by reference.

BACKGROUND

1. Technical Field

Embodiments relate to a display device, and, to a pixel and a display device including the pixel.

2. Description of the Related Art

A display device may include pixels. Each of the pixels may include transistors, a light-emitting element electrically coupled or electrically connected to the transistors, and a capacitor. The transistors may be turned on in response to respective signals provided through lines, and a predetermined driving current may be generated by the turned-on transistors. The light-emitting element may emit light in response to the driving current.

Recently, a method of driving a display device at low frequency is being developed to improve driving efficiency of the display device and minimize power consumption of the display device. Therefore, when the display device is driven at a low frequency, a method that may be capable of improving display quality may be required.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments are directed to a pixel which may periodically apply a bias to a driving transistor during low-frequency driving.

Embodiments are directed to a display device that has the pixel and that is driven at various driving frequencies.

However, objects of the disclosure are not limited to the foregoing objects, and may be expanded in various forms without departing from the spirit and scope of the disclosure.

An embodiment may provide for a pixel for a display device. The pixel may include a light-emitting element, a first transistor that may include a first electrode electrically connected to a first node electrically connected to a first power source, and controls a driving current based on a voltage of a second node, a second transistor that may be electrically connected between a data line and the first node, and may be turned on in response to a first scan signal supplied through a first scan line, a third transistor that may be electrically connected between the second node and a third node electrically connected to a second electrode of the first transistor, and may be turned on in response to the first scan signal, and a fourth transistor that may be turned on in response to a second scan signal supplied through a second scan line and may apply a bias voltage to the first transistor. The fourth transistor may be turned on at a first frequency, and the second transistor and the third transistor may be turned on at a second frequency different from the first frequency.

The second frequency may be lower than the first frequency.

In an embodiment, the second frequency may be identical to an image refresh rate and may be an aliquot of the first frequency.

In an embodiment, the pixel may further include a fifth transistor that may be electrically connected between the first power source and the first node and may be turned off in response to an emission control signal supplied through an emission control line, a sixth transistor that may be electrically connected between the third node and a fourth node electrically connected to a first electrode of the light-emitting element, and may be turned off in response to the emission control signal, a seventh transistor that may be electrically connected between the fourth node and a first initialization power source, and may be turned on in response to the second scan signal, an eighth transistor that may be electrically connected between the second node and a second initialization power source, and may be turned on in response to a third scan signal supplied through a third scan line, and a storage capacitor electrically connected between the first power source and the second node.

In an embodiment, the fifth to seventh transistors may be turned off at the first frequency, and the eighth transistor may be turned on at the second frequency.

In an embodiment, the fourth transistor may be electrically connected between the emission control line and the third node, and may apply the emission control signal, as the bias voltage, to the third node in response to the second scan signal.

In an embodiment, the fourth transistor may be electrically connected between the emission control line and the first node, and may apply the emission control signal, as the bias voltage, to the third node in response to the second scan signal.

In an embodiment, the fourth transistor may be electrically connected between a bias power source and the third node or between the bias power source and the first node, and may apply a voltage of the bias power source, as the bias voltage, to the third node or the first node in response to the second scan signal.

An embodiment may provide for a pixel of a display device. The pixel may include a light-emitting element, a first transistor that may include a first electrode electrically connected to a first node electrically connected to a first power source, and controls a driving current based on a voltage of a second node, a second transistor that may be electrically connected between a data line and the first node, and may be turned on in response to a first scan signal supplied through a first scan line, a third transistor that may be electrically connected between the second node and a third node electrically connected to a second electrode of the first transistor, and may be turned on in response to a second scan signal supplied through a second scan line, and a fourth transistor that may be turned on in response to a third scan signal supplied through a third scan line and may apply a bias voltage to the first transistor. The fourth transistor may be turned on at a first frequency, the second transistor and the third transistor may be turned on at a second frequency lower than the first frequency, and a length of a turn-on period of the second transistor and a length of a turn-on period of the third transistor may be different from each other.

In an embodiment, the second frequency may be identical to that of an image refresh rate and correspond to an aliquot of the first frequency.

The pixel may further include a fifth transistor that may be electrically connected between the first power source and the first node and is turned off in response to an emission control signal supplied through a first emission control line, a sixth transistor that may be electrically connected between the third node a fourth node electrically connected to a first electrode of the light-emitting element, and may be turned off in response to an emission control signal supplied through a second emission control line, a seventh transistor that may be electrically connected between the fourth node and an initialization power source, and may be turned on in response to the third scan signal supplied through a fourth scan line, and a storage capacitor electrically connected between the first power source and the second node.

In an embodiment, the fifth and sixth transistors may be turned off at the first frequency.

In an embodiment, a part of a turn-off period of the fifth transistor may overlap a part of a turn-on period of the sixth transistor, and the third transistor and the seventh transistor may be simultaneously controlled.

In an embodiment, a turn-on period of the fourth transistor may not overlap a turn-on period of the third transistor and a turn-on period of the seventh transistor.

In an embodiment, the fourth transistor may be electrically connected between the first emission control line and the third node or between the first emission control line and the first node, and may apply the emission control signal, as the bias voltage, to the third node or the first node in response to the third scan signal.

The fourth transistor may be electrically connected between a bias power source and the third node or between the bias power source and the first node, and may apply a voltage of the bias power source, as the bias voltage, to the third node or the first node in response to the third scan signal.

An embodiment may provide for a display device. The display device may include pixels electrically connected to first scan lines, second scan lines, emission control lines, and data lines, a scan driver may supply a second scan signal to the second scan lines at a first frequency, and supply a first scan signal to the first scan lines at a second frequency corresponding to an image refresh rate of the pixels, an emission driver that may supply an emission control signal to the emission control lines at the first frequency, a data driver that may supply data signals to respective data lines at the second frequency, and a timing controller that may control driving of the scan driver, the emission driver, and the data driver. Among the pixels, a pixel may be disposed in an i-th horizontal line (where i is a natural number) may include a light-emitting element, a first transistor that may include a first electrode electrically connected to a first node electrically connected to a first power source and controls a driving current based on a voltage of a second node, a second transistor that may be electrically connected between a data line and the first node, and may be turned on in response to a first scan signal supplied through an i-th first scan line, a third transistor that may be electrically connected between the second node and a third node electrically connected to a second electrode of the first transistor, and may be turned on in response to the first scan signal, and a fourth transistor that may be turned on in response to a second scan signal supplied through an i-th second scan line and may apply a bias voltage to the first transistor. The second frequency may be an aliquot of the first frequency.

In an embodiment, the scan driver may include a first scan driver that may supply the first scan signal to each of the first scan lines at the second frequency, and a second scan driver that may supply the second scan signal to each of the second scan lines at the second frequency.

In an embodiment, the first scan driver may supply the first scan signal during a display-scan period of one frame period, and may not supply the first scan signal during a self-scan period of the one frame period, the second scan driver may supply the second scan signal during the display-scan period and the self-scan period, the emission driver may supply the emission control signal during the display-scan period and the self-scan period, and the data signals may be written to the pixels during the display-scan period.

In an embodiment, the pixel disposed in the i-th horizontal line may further include a fifth transistor that may be electrically connected between the first power source and the first node, and may be turned off in response to the emission control signal supplied through an i-th emission control line, a sixth transistor that may be electrically connected between the third node and a fourth node electrically connected to a first electrode of the light-emitting element, and may be turned off in response to the emission control signal supplied through the i-th emission control line, a seventh transistor that may be electrically connected between the fourth node and a first initialization power source, and may be turned on in response to the second scan signal supplied through the i-th second scan line, an eighth transistor that may be electrically connected between the second node and a second initialization power source, and may be turned on in response to the first scan signal supplied through an i-1-th first scan line, and a storage capacitor electrically connected between the first power source and the second node.

In an embodiment, the fourth transistor may be electrically connected between the i-th emission control line and the third node.

BRIEF DESCRIPTION OF THE DRAWINGS

The above and other features will become more apparent by describing in further detail embodiments thereof with reference to the accompanying drawings, in which.

DETAILED DESCRIPTION OF THE EMBODIMENTS

Figure 1:
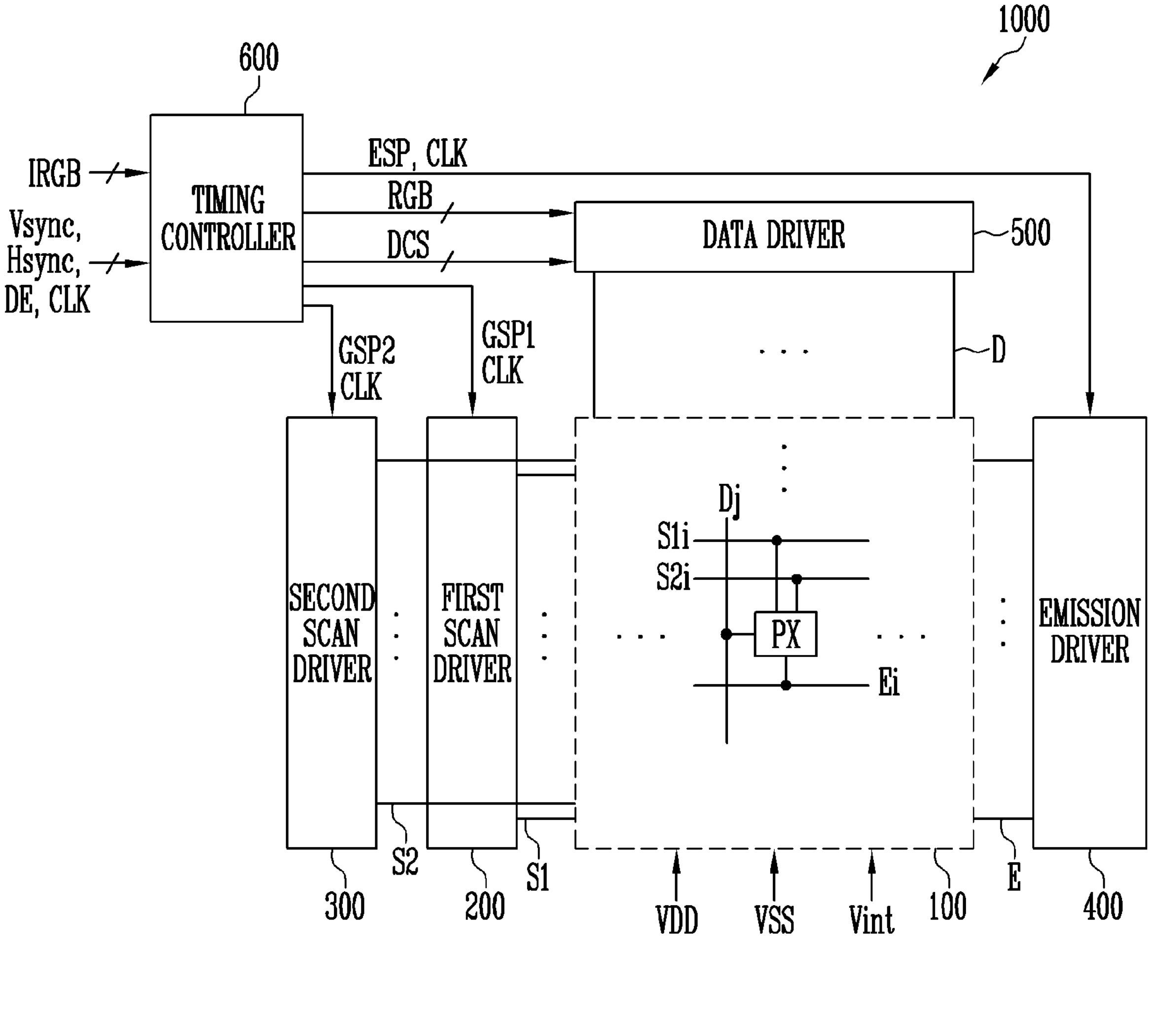
FIG. 1 is a block diagram illustrating a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Some of the parts which are not associated with the description may not be provided in order to describe embodiments of the disclosure and like reference numerals refer to like elements throughout the specification.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

In the drawings, sizes and thicknesses of elements may be enlarged for better understanding, clarity, and ease of description thereof. However, the disclosure is not limited to the illustrated sizes and thicknesses. In the drawings, the thicknesses of layers, films, panels, regions, and other elements, may be exaggerated for clarity. In the drawings, for better understanding and ease of description, the thicknesses of some layers and areas may be exaggerated.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Embodiments of the disclosure will hereinafter be described with reference to the accompanying drawings.

FIG. 1 is a block diagram illustrating a display device according to an embodiment.

Referring to FIG. 1, a display device 1000 may include a pixel unit 100, scan drivers 200 and 300, an emission driver 400, a data driver 500, and a timing controller 600.

The scan drivers 200 and 300 may be divided into the first scan driver 200 and the second scan driver 300 according to a configuration and operation thereof. However, the division of the scan drivers is intended for convenience of description, and at least some of the scan drivers and the emission driver may be integrated into a single driving circuit, module or the like according to design.

The display device 1000 may display an image or images at various image refresh rates (i.e., a refresh rate, a driving frequency or a screen display rate) depending on driving conditions. The image refresh rate may be the frequency at which a data signal is actually written to the driving transistor of each pixel PX. For example, the image refresh rate may also be referred to as a scanning rate or a screen display frequency, and may represent the frequency at which a display image is reproduced or refreshed per second.

In an embodiment, the image refresh rate may be the output frequency of the data driver 500 and/or the first scan driver 200 which may output a write scan signal. For example, the refresh rate for video driving may be a frequency of about 60 Hz or higher (e.g., about 120 Hz). Here, a scan signal output from the first scan driver 200 may be supplied to each horizontal line (pixel row) 60 times per second.

In an embodiment, the display device 1000 may adjust the output frequencies of the first and second scan drivers 200 and 300 and the output frequency of the data driver 500 corresponding thereto depending on the driving conditions. For example, the display device 1000 may display an image or images in accordance with various image refresh rates in a range of about 1 Hz to about 120 Hz. However, this is only exemplary, and the display device 1000 may also display an image or images at an image refresh rate of about 120 Hz or higher (e.g., about 240 Hz or about 480 Hz).

The timing controller 600 may receive input image data IRGB and timing signals Vsync, Hsync, DE, and CLK from a host system, such as an application processor (AP), through a predetermined interface.

The timing controller 600 may generate a data driving control signal DCS based on the input image data IRGB and timing signals, such as a vertical synchronization signal Vsync, a horizontal synchronization signal Hsync, a data enable signal DE, and a clock signal CLK. The data driving control signal DCS may be supplied to the data driver 500. The timing controller 600 may rearrange the input image data IRGB and may provide the rearranged data to the data driver 500.

The timing controller 600 may supply gate start pulses GSP1 and GSP2 and clock signals CLK to the first scan driver 200 and the second scan driver 300 based on the timing signals.

The timing controller 600 may supply an emission start pulse ESP and the clock signals CLK to the emission driver 400 based on the timing signals. The emission start pulse ESP may control the first timing of an emission control signal. The clock signals may be used to shift the emission start pulse.

The first gate start pulse GSP1 may control the first timing of a scan signal (e.g., a first scan signal) supplied from the first scan driver 200. The clock signals CLK may be used to shift the first gate start pulse GSP1.

The second gate start pulse GSP2 may control the first timing of a scan signal (e.g., a second scan signal) supplied from the second scan driver 300. The clock signals CLK may be used to shift a second gate start pulse GSP2.

In an embodiment, pulse widths of the first and second gate start pulses GSP1 and GSP2 may differ from each other. Therefore, the widths of scan signals corresponding to respective gate start pulses may also differ from each other.

The data driver 500 may convert the rearranged image data RGB into analog data signals. The data driver 500 may supply data signals to data lines D in response to the data driving control signal DCS. The data signals supplied through the data lines D may be supplied to pixels PX selected by the scan signals.

The data driver 500 may supply data signals to the data lines D during one frame period in accordance with the image refresh rate. For example, the data driver 500 may supply data signals to the data lines D at the same frequency as the image refresh rate. Here, the data signals supplied through the data lines D may be synchronized with the scan signals supplied through first scan lines S1.

The first scan driver 200 supplies the scan signals to the first scan lines S1 in response to the first gate start pulse GSP1. For example, the first scan driver 200 may sequentially supply the scan signals to the first scan lines S1. Here, each scan signal may be set to a gate-on voltage (e.g., a logic low voltage) so that a transistor included in the corresponding pixel PX can be turned on.

In an embodiment, data signals may be supplied to the pixels PX in response to the first scan signals supplied through the first scan lines S1.

The first scan driver 200 may supply the scan signals to the first scan lines S1 at the same frequency (e.g., a second frequency) as the image refresh rate of the display device 1000. In an embodiment, the second frequency may correspond to the output frequency of the first gate start pulse GSP1 that may be supplied from the timing controller 600 to the first scan driver 200.

The second frequency may be set to an aliquot of the first frequency at which the emission driver 400 may be driven.

The first scan driver 200 may supply the scan signals to the first scan lines S1 during a display-scan period of one frame. For example, the first scan driver 200 may supply at least one scan signal to each of the first scan lines S1 during the display-scan period.

The second scan driver 300 may supply scan signals to second scan lines S2 in response to the second gate start pulse GSP2. For example, the second scan driver 300 may sequentially supply second scan signals to the second scan lines S2. Here, each scan signal supplied from the second scan driver 300 may be set to a gate-on voltage (e.g., a logic low voltage) so that a transistor included in the corresponding pixel PX may be turned on.

In an embodiment, a voltage for applying a bias to the driving transistors of the pixels PX may be supplied in response to the second scan signals supplied through the second scan lines S2. For example, when a second scan signal is supplied to the corresponding pixel PX, a predetermined bias voltage may be applied to a source electrode and/or a drain electrode of the driving transistor of the pixel PX, and the driving transistor may be on-biased.

The second scan driver 300 may supply the scan signals to the second scan lines S2 at the first frequency that may always be constant regardless of the frequency of the image refresh rate. Here, the first frequency may correspond to the output frequency of the second gate start pulse GSP2 that may be supplied from the timing controller 600 to the second scan driver 300.

The first frequency at which the second scan driver 300 may supply the scan signals may be higher than that of the image refresh rate. In an embodiment, the frequency (and the second frequency) of the image refresh rate may be set to an aliquot of the first frequency. For example, the first frequency may be set to about twice that of the maximum refresh rate of the display device 1000 (i.e., the maximum driving frequency set in the display device 1000). When the maximum refresh rate of the display device 1000 is about 120 Hz, the first frequency may be set to about 240 Hz. Therefore, during one frame period, a scanning operation of sequentially outputting scan signals to the second scan lines S2 may be periodically repeated several times at predetermined intervals.

For example, at all driving frequencies at which the display device 1000 may be driven, the second scan driver 300 may perform scanning once during a display-scan period and may perform scanning at least once according to the image refresh rate during a self-scan period. For example, the scan signals may be sequentially output once to respective second scan lines S2 during the display-scan period, and the scan signals may be sequentially output once or more to respective second scan lines S2 during the self-scan period.

When the image refresh rate decreases, the number of repetitions of an operation in which the second scan driver 300 may supply scan signals to respective second scan lines S2 during one frame period may increase.

The emission driver 400 may supply emission control signals to emission control lines E in response to an emission start pulse ESP. For example, the emission driver 400 may sequentially supply the emission control signals to the emission control lines E. When the emission control signals are sequentially supplied through the emission control lines E, the pixels PX may become non-emissive on a horizontal line basis. For this operation, each emission control signal may be set to a gate-off voltage (e.g., a logic high voltage) so that some transistors (e.g., P-type transistors) included in the pixels PX may be turned off.

In an embodiment, similar to the second scan driver 300, the emission driver 400 may supply the emission control signals to the emission control lines E at the first frequency. Therefore, during one frame period, the emission control signals supplied through respective emission control lines E may be repeatedly supplied at predetermined intervals.

Accordingly, when the image refresh rate decreases, the number of repetitions of the operation of supplying emission control signals during one frame period may increase.

Each of the first and second scan drivers 200 and 300 and the emission driver 300 may be individually mounted on a substrate through a thin-film process. Each of the first and second scan drivers 200 and 300 may be located or disposed on both sides of the pixel unit 100. The emission driver 400 may also be located or disposed on both sides of the pixel unit 100. However, the disclosure is not limited thereto.

The pixel unit 100 may include pixels PX which may be located or disposed to be electrically coupled or electrically connected to the data lines D, the scan lines S1 and S2, and the emission control lines E. The pixels PX may be supplied with voltages of a first power source VDD, a second power source VSS, and an initialization power source Vint from external devices.

In an embodiment, the signal lines S1, S2, emission control lines E, and data lines D electrically coupled or electrically connected to each pixel PX may be set in various forms depending on the circuit structure of the pixel PX.

Pixels PX located or disposed on a current horizontal line (or a current pixel line) may be additionally electrically coupled or electrically connected to scan lines located or disposed on a previous horizontal line (or a previous pixel row) and/or scan lines located or disposed on a subsequent horizontal line (or a subsequent pixel row) depending on the circuit structure of the pixels PX. For this operation, in the pixel unit 100, dummy scan lines and/or dummy emission control lines, which are not illustrated, may be additionally formed.

Figure 2A:
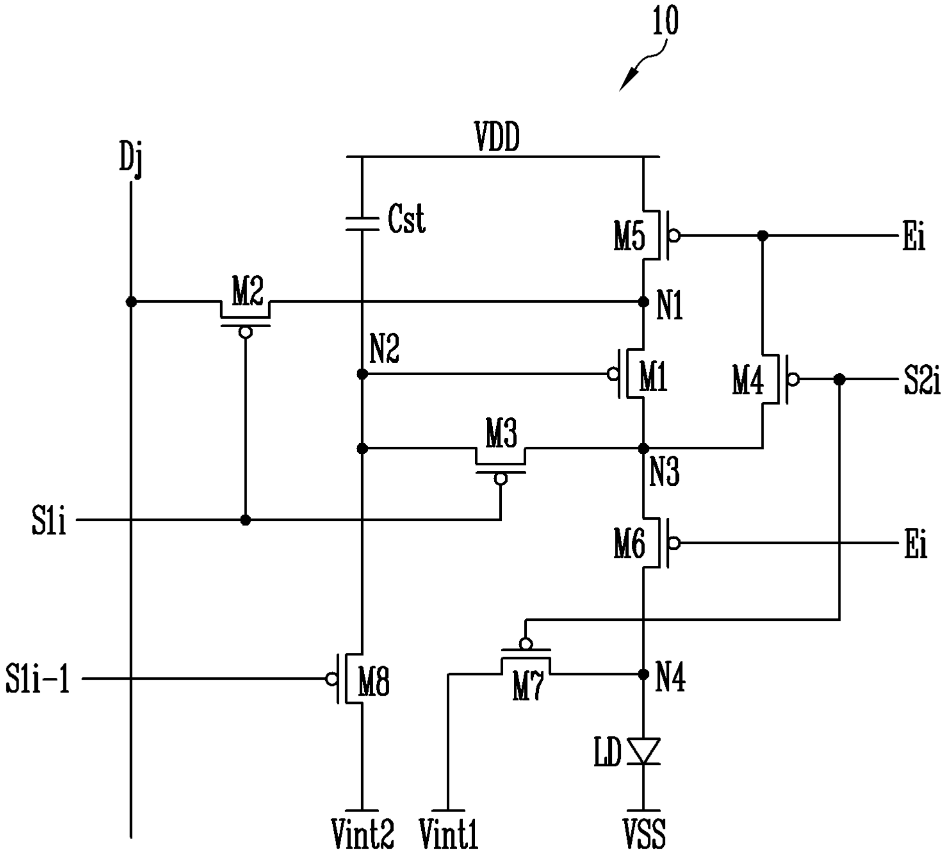
FIG. 2A is an equivalent circuit diagram illustrating a pixel according to an embodiment.

FIG. 2A is an equivalent circuit diagram illustrating a pixel according to an embodiment.

In FIG. 2A, for the convenience of description, a pixel which may be located or disposed on an i-th horizontal line and may be electrically coupled or electrically connected to a j-th data line Dj is illustrated.

Referring to FIG. 2A, a pixel 10 may include a light-emitting element LD, first to eighth transistors M1 to M8, and a storage capacitor Cst.

A first electrode (an anode electrode or a cathode electrode) of the light-emitting element LD may be electrically coupled or electrically connected to a fourth node N4, and a second electrode thereof (a cathode electrode or an anode electrode) may be electrically coupled or electrically connected to a second power source VSS. The light-emitting element LD may generate light with predetermined luminance in accordance with the amount of current supplied from the first transistor M1.

In an embodiment, the light-emitting element LD may be an organic light-emitting diode including an organic light-emitting layer. In an embodiment, the light-emitting element LD may be an inorganic light-emitting element formed of an inorganic material. Alternatively, the light-emitting element LD may have a form or structure in which inorganic light-emitting elements may be electrically coupled or electrically connected in parallel and/or in series between the second power source VSS and the fourth node N4.

A first electrode of the first transistor M1 (or driving transistor) may be electrically coupled or electrically connected to a first node N1, and a second electrode thereof may be electrically coupled or electrically connected to a third node N3. A gate electrode of the first transistor M1 may be electrically coupled or electrically connected to a second node N2. The first transistor M1 may control the amount of current flowing from the first power source VDD into the second power source VSS via the light-emitting element LD in accordance with the voltage of the second node N2. For this operation, the voltage of the first power source VDD may be set to a voltage higher than that of the second power source VSS.

The second transistor M2 may be electrically coupled or electrically connected between the data line Dj and the first node N1. A gate electrode of the second transistor M2 may be electrically coupled or electrically connected to an i-th first scan line S1*i*. The second transistor M2 may be turned on when a scan signal (e.g., a first scan signal) may be supplied through the i-th first scan line S1*i*, and may then electrically couple or electrically connect the data line Dj to the first node N1.

The third transistor M3 may be electrically coupled or electrically connected between the second electrode of the first transistor M1 (i.e., the third node N3) and the second node N2. A gate electrode of the third transistor M3 may be electrically coupled or electrically connected to the i-th first scan line S1*i*. When a scan signal is supplied through the i-th first scan line S1*i*, the third transistor M3 may be turned on, and may then electrically couple or electrically connect the second electrode of the first transistor M1 to the second node N2. For example, the second transistor M2 and the third transistor M3 may be simultaneously controlled. When the third transistor M3 is turned on, the first transistor M1 may be electrically coupled or electrically connected in a diode configuration. Accordingly, writing of data to the first transistor M1 and the compensation of a threshold voltage may be performed together.

The fourth transistor M4 may be electrically coupled or electrically connected between the third node N3 and the i-th emission control line Ei. A gate electrode of the fourth transistor M4 may be electrically coupled or electrically connected to an i-th second scan line S2*i*. The fourth transistor M4 may be turned on when a scan signal (e.g., a second scan signal) is supplied through the i-th second scan line S2*i*, and may then supply the voltage of the i-th emission control line Ei to the third node N3. Here, the emission control signal (e.g., a gate-off voltage or a logic high voltage) may be supplied through the i-th emission control line Ei. For example, the gate-off voltage (i.e., the emission control signal) may be in a range of about 5 to about 7 V.

Accordingly, a predetermined high voltage may be applied, as a bias voltage, to the drain electrode (and the source electrode) of the first transistor M1 by the turn-on operation of the fourth transistor M4, and the first transistor M1 may have an on-bias state (i.e., on-biased).

The fifth transistor M5 may be electrically coupled or electrically connected between the first power source VDD and the first node N1. A gate electrode of the fifth transistor M5 may be electrically coupled or electrically connected to the i-th emission control line Ei. The fifth transistor M5 may be turned off in a case where the emission control signal is supplied through the i-th emission control line Ei, and may be turned on in the remaining cases.

The sixth transistor M6 may be electrically coupled or electrically connected between the second electrode of the first transistor M1 (i.e., the third node N3) and the first electrode of the light-emitting element LD (i.e., the fourth node N4). A gate electrode of the sixth transistor M6 may be electrically coupled or electrically connected to the i-th emission control line Ei. The sixth transistor M6 may be turned off in a case where the emission control signal is supplied through the i-th emission control line Ei, and may be turned on in the remaining cases. Therefore, the fifth transistor M5 and the sixth transistor M6 may be simultaneously controlled.

The seventh transistor M7 may be electrically coupled or electrically connected between the first electrode of the light emitting element LD (i.e., the fourth node N4) and a first initialization power source Vint1. A gate electrode of the seventh transistor M7 may be electrically coupled or electrically connected to the i-th second scan line S2*i*. The seventh transistor M7 may be turned on when a scan signal is supplied through the i-th second scan line S2*i*, and may then supply the voltage of the first initialization power source Vint1 to the first electrode of the light-emitting element LD (i.e., the fourth node N4).

When the voltage of the first initialization power source Vint1 is supplied to the first electrode of the light-emitting element LD, a parasitic capacitor of the light-emitting element LD may be discharged. As a residual voltage charged in the parasitic capacitor is discharged (eliminated), unintended fine light emission may be prevented. Therefore, black representation capability of the pixel 10 may be improved.

The eighth transistor M8 may be electrically coupled or electrically connected between the second node N2 and a second initialization power source Vint2. A gate electrode of the eighth transistor M8 may be_electrically coupled or electrically connected to a third scan line (or an i-1-th first scan line S1*i*−1). The eighth transistor M8 may be turned on when a scan signal (e.g., a first scan signal) is supplied through the i-1-th first scan line S1*i*−1, and may then supply the voltage of the second initialization power source Vint2 to the second node N2 (i.e., the gate electrode of the first transistor M1). Therefore, the gate voltage of the first transistor M1 may be initialized.

In an embodiment, the first initialization power source Vint1 and the second initialization power source Vint2 may generate different voltages. For example, the voltage for initializing the second node N2 and the voltage for initializing the fourth node N4 may be set to different voltages.

When the voltage of the second initialization power source Vint2 to be supplied to the second node N2 is excessively low during low-frequency driving at which the length of one frame period increases, a change in the hysteresis of the first transistor M1 in the corresponding frame period may be worsened. Such hysteresis may cause a flicker phenomenon at low frequency driving. Therefore, in the display device driven at low frequency, the voltage of the second initialization power source Vint2 higher than that of the second power source VSS may be required.

During this low frequency driving, when an on-bias is applied to the first transistor M1 (i.e., when the first transistor M1 is on-biased) using the signal that may be supplied through the data line Dj through the turn-on operation of the second transistor M2, a serious deviation in hysteresis attributable to the difference between the grayscale values of adjacent pixels may occur. Therefore, the difference between the amounts of shift of the threshold voltages of driving transistors in the adjacent pixels occurs, and thus a motion blur (i.e., a ghost phenomenon) caused by such a difference may be perceived.

To solve this problem, the pixel 10 and the display device (e.g., 1000 of FIG. 1) having the pixel 10 according to an embodiment may periodically apply a bias, as a constant voltage, to the drain electrode (and/or the source electrode) of the first transistor M1 using the fourth transistor M4. Therefore, the hysteresis deviation attributable to the grayscale difference between adjacent pixels may be removed, and thus an image blur attributable to the hysteresis deviation may be reduced (or eliminated).

In an embodiment, the first to eighth transistors M1 to M8 may be formed of polysilicon semiconductor transistors. For example, each of the first to eighth transistors M1 to M8 may include, as an active layer (channel), a polysilicon semiconductor layer formed through a Low-temperature polycrystalline silicon (LTPS) process. However, this is only exemplary, and at least one of the first to eighth transistors M1 to M8 may be replaced with an oxide semiconductor transistor or the like within the spirit and scope of the disclosure.

Figure 2B:
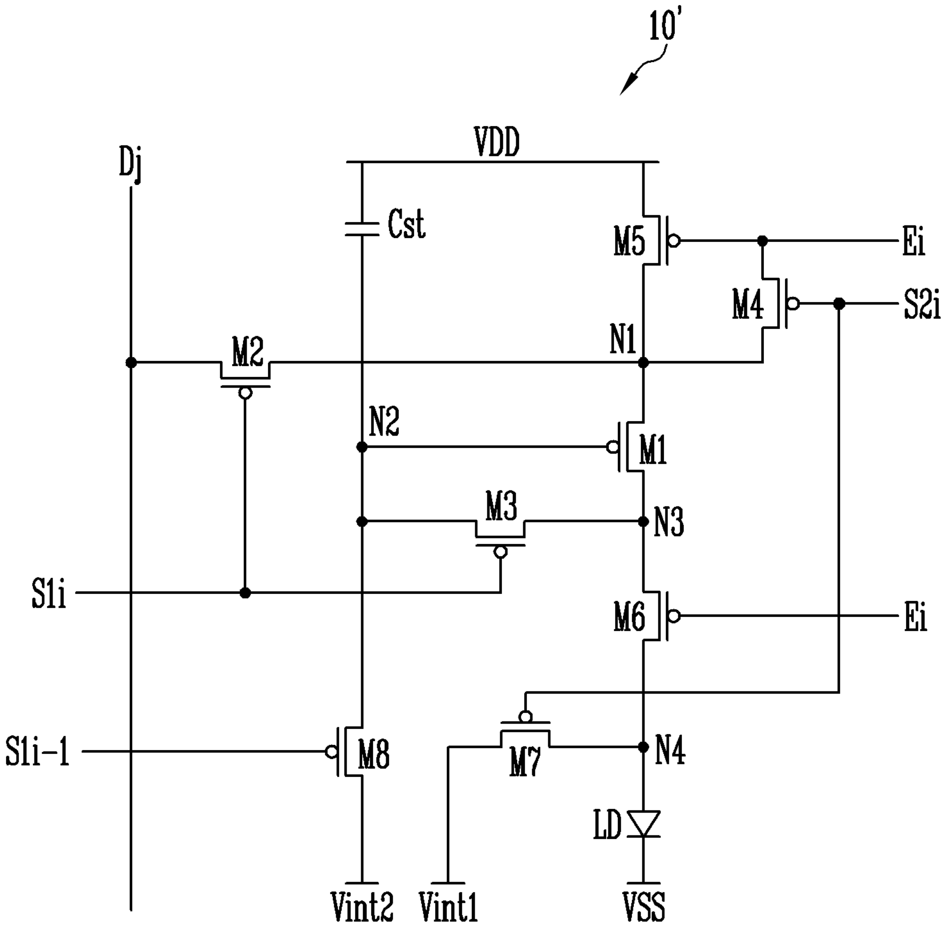
FIG. 2B is an equivalent circuit diagram illustrating a modification of the pixel of FIG. 2A.

FIG. 2B is an equivalent circuit diagram illustrating a modification of the pixel of FIG. 2A.

Since a pixel 10' of FIG. 2B may be identical or similar to that of FIG. 2A except for the coupling relationship of the fourth transistor, the same reference numerals are used to designate the same or corresponding components, and thus a repeated description thereof will be omitted.

Referring to FIG. 2B, the pixel 10' may include a light-emitting element LD, first to eighth transistors M1 to M8, and a storage capacitor Cst.

A gate electrode of the fourth transistor M4 may be electrically coupled or electrically connected to an i-th emission control line Ei. A second electrode of the fourth transistor M4 may be electrically coupled or electrically connected to a first node N1 (i.e., a source electrode of the first transistor M1). When the fourth transistor M4 is turned on, a logic high voltage may be supplied to the i-th emission control line Ei. Therefore, when the fourth transistor M4 is turned on, a logic high voltage may be supplied, as a bias voltage, to the source electrode of the first transistor M1, and the first transistor M1 may have an on-bias state.

As illustrated in FIGS. 2A and 2B, when one electrode of the fourth transistor M4 is electrically coupled or electrically connected to any one of the source electrode and the drain electrode of the first transistor M1, the first transistor M1 may be on-biased during a predetermined period.

Figure 3A:
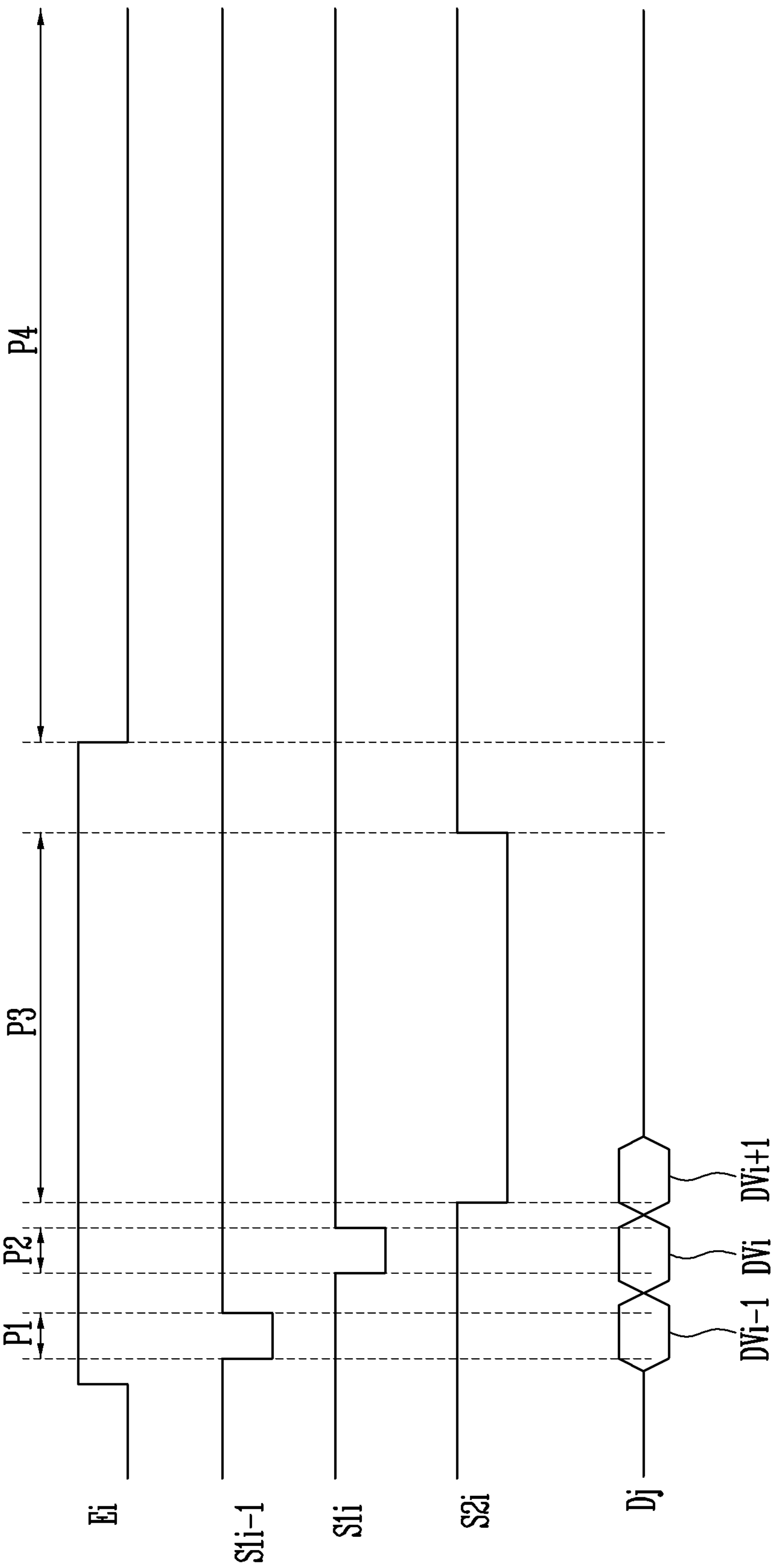
FIG. 3A is a timing diagram illustrating an example of driving of the pixel of FIG. 2A.

FIG. 3A is a timing diagram illustrating an example of driving of the pixel of FIG. 2A.

Referring to FIGS. 2A and 3A, the pixel 10 may be supplied with signals for displaying an image during a display-scan period. The display-scan period may include a period during which a data signal DVi corresponding to an output image may be written.

Hereinafter, for convenience of description, a description may be made such that an i-th emission control line Ei may be used as an emission control line Ei, an i-th first scan line S1*i* may be used as a first scan line S1*i*, an i-th second scan line S2*i* may be used as a second scan line S2*i*, and an i-1-th first scan line S1*i*−1 may be used as a previous first scan line S1*i*−1.

In an embodiment, the first scan signals that may be supplied through the first scan lines S1*i*−1 and S1*i* may have a pulse width of 1 horizontal period (1H) or less. The first scan signal and the second scan signal supplied through the second scan line S2*i* may be defined as logic low voltages, and emission control signals for turning off the fifth and sixth transistors M5 and M6 may be defined as logic high voltages. However, this is merely exemplary, so that the pulse widths and logical levels of the scan signals and emission control signals are not limited thereto, and may be changed depending on the pixel structures, the types of transistors, or the like within the spirit and scope of the disclosure.

An emission control signal may be supplied through an emission control line Ei. The emission control signal may be maintained during a first period P1 to a third period P3.

During the first period P1, the emission control signal may be supplied through the emission control line Ei, and the first scan signal may be supplied through the previous first scan line S1*i*−1. The fifth and sixth transistors M5 and M6 may be turned off in response to the emission control signal. The eighth transistor M8 may be turned on in response to the first scan signal supplied through the previous first scan line S1*i*1.

During the first period P1, the supply of the driving current to the light-emitting element LD may be stopped. Since the eighth transistor M8 is turned on, the voltage of the second initialization power source Vint2 may be supplied to the gate electrode of the first transistor M1 (i.e., the second node N2). Therefore, the gate voltage of the first transistor M1 may be initialized during the first period P1.

During the second period P2, the first scan signal may be supplied through the first scan line S1*i* (or the current first scan line). Accordingly, the second and third transistors M2 and M3 may be turned on. The second transistor M2 may be turned on, so that an i-th data signal DVi may be supplied to the first node N1 through the data line Dj.

Since the second transistor M2 and the third transistor M3 may be turned on together, the first transistor M1 may be electrically coupled or electrically connected in a diode configuration. For example, the second period P2 may be a data writing and threshold voltage compensation period.

During the third period P3, the second scan signal may be supplied through the second scan line S2*i*. Accordingly, the fourth and seventh transistors M4 and M7 may be turned on.

When the seventh transistor M7 is turned on, the voltage of the first initialization power source Vint1 may be supplied to the fourth node N4. Therefore, the voltage of the first electrode (e.g., the anode electrode) of the light-emitting element LD may be initialized, and the voltage of the parasitic capacitor formed in the light-emitting element LD may be discharged (or removed).

When the fourth transistor M4 is turned on, a gate-off voltage (e.g., a logic high voltage) of the emission control signal may be supplied to the third node N3. The emission control signal (i.e., logic high voltage of the emission control signal) may be in a range of about 5 to about 7 V, and the first transistor M1 may be on-biased during the third period P3. In an embodiment, the second scan signal may have a pulse width of about 4 horizontal periods (4H) or more. Therefore, for a sufficient period of time, the logic high voltage of the emission control signal may be supplied to the first transistor M1.

Meanwhile, during the third period P3, the first transistors M1 of all pixels arranged or disposed in an i-th pixel row may be on-biased in response to the emission control signal, and thus the difference between bias voltages may be removed. Therefore, the hysteresis deviation between pixels may be removed (or reduced).

For example, a turn-on period of the third transistor M3 and a turn-on period of the fourth transistor M4 may not overlap each other. For example, the initialization/compensation period and the bias period of the first transistor M1 may be separated from each other.

Thereafter, during the fourth period P4, the supply of the emission control signal may be stopped and the fifth and sixth transistors M5 and M6 may be turned on. When the fifth and sixth transistors M5 and M6 are turned on, a driving current generated based on the data signal DVi may be supplied to the light-emitting element LD, and the light-emitting element LD may emit light with luminance corresponding to the driving current. For example, the fourth period P4 may be an emission period.

For example, the display-scan period may include an initialization period (e.g., the first period P1), the write and compensation period (e.g., the second period P2), the bias period (e.g., the third period P3), and the emission period (e.g., the fourth period P4). In this case, the first to third periods P1 to P3 may correspond to a non-emission period of the pixel 10.

An operation corresponding to the display-scan period may be implemented in response to scan signals supplied through the first scan lines S1*i*−1 and S1*i*, and may be synchronized with the frequency at which the first scan driver 200 may be driven (e.g., this frequency may be described as being the second frequency.

The pixel 10' of FIG. 2B may also perform the same operation as the above-described operation during the display-scan period.

Although it is illustrated that, for convenience of description, a single first scan signal may be supplied through each of the first scan lines S1*i*−1 and S1*i* during the first period P1 and the second period P2 in FIG. 3A, the disclosure is not limited thereto. For example, first scan signals may be supplied through each of the first scan lines S1*i*−1 and S1*i*. Even in this case, the actual operating process may be identical to that of FIG. 3A, and thus a detailed description thereof will be omitted.

Figure 3B:
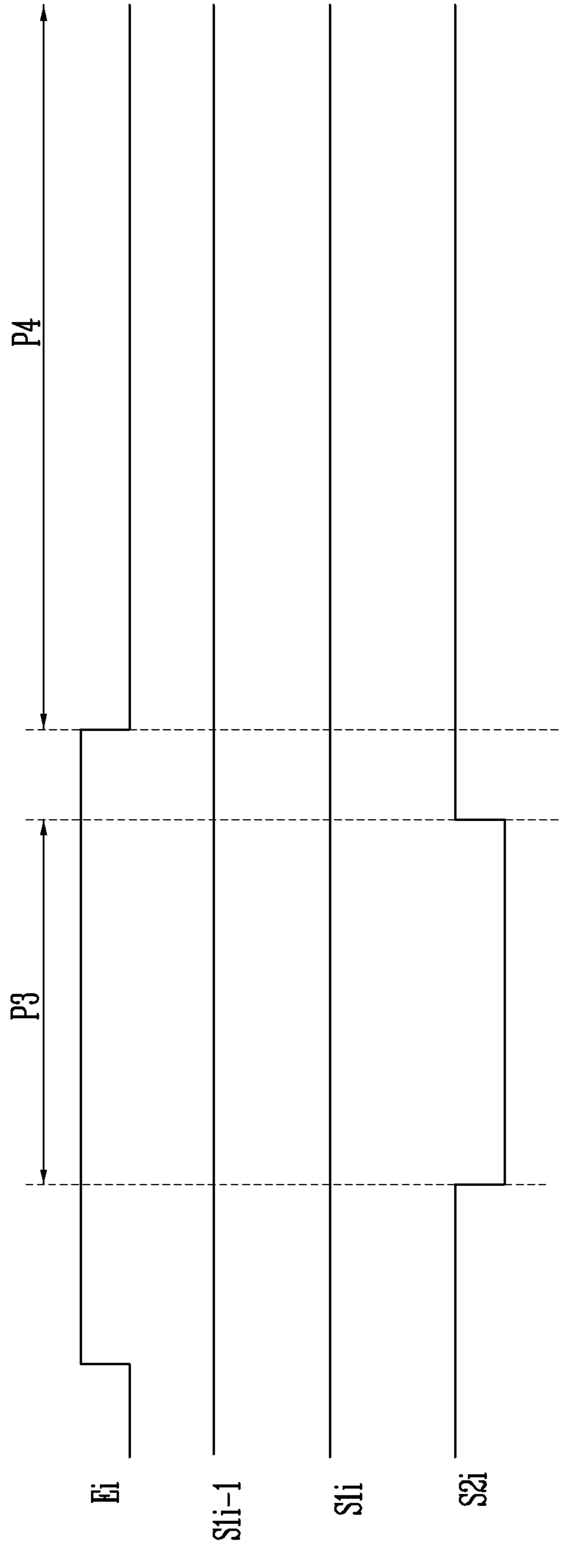
FIG. 3B is a timing diagram illustrating an example of driving of the pixel of FIG. 2A.

FIG. 3B is a timing diagram illustrating an example of driving of the pixel of FIG. 2A.

Referring to FIGS. 2A and 3B, in order to maintain the luminance of an image that may be output during a display-scan period, an emission control signal may be applied to one electrode (e.g., the drain electrode or the third node N3) of the first transistor M1 during a self-scan period.

A single frame may include at least one self-scan period depending on the image frame rate. The self-scan period may include a bias period (e.g., the third period P3) and an emission period (e.g., the fourth period P4). In an embodiment, an operation corresponding to the self-scan period may be substantially the same as that of the display-scan period except that the first scan signal may not be supplied.

In an embodiment, during the self-scan period, scan signals may not be supplied to the second and third transistors M2 and M3. Scan signals may not be supplied to the eighth transistor M8. For example, during the self-scan period, first scan signals supplied through the first scan lines S1*i*−1 and S1*i* may have gate-off voltages (e.g., logic high voltages).

Therefore, the self-scan period may not include the initialization period (e.g., the first period P1 of FIG. 3A) and the write and compensation period (e.g., the second period P2 of FIG. 3A).

Since the second, third, and eighth transistors M2, M3, and M8 remain turned off, the gate voltage (i.e., the voltage of the second node N2) of the first transistor M1 may not be influenced by driving in the self-scan period.

In other words, the fourth to seventh transistors M4 to M7 may be turned on at the first frequency, and the second, third, and eighth transistors M2, M3, and M8 may be turned on at the second frequency that may be different from the first frequency. For example, the second frequency may be lower than the first frequency.

Among the non-emission periods, during the third period P3, the second scan signal may be supplied through the second scan line S2*i*. The fourth transistor M4 may be turned on in response to the second scan signal. When the fourth transistor M4 is turned on, a logic high voltage of the emission control signal may be supplied to the third node N3. Accordingly, since an on-bias may be applied to the first transistor M1 during the third period P3, a flicker at low-frequency driving may be improved.

The second scan signal and the emission control signal may be supplied at the first frequency regardless of the image refresh rate. Therefore, the application of an on-bias during the third period P3 may always be periodically performed even when the image refresh rate may be changed. Therefore, in accordance with various image refresh rates (for example, in low-frequency driving), a flicker may be improved.

Thereafter, during the fourth period P4, the first transistor M4 may be turned off, and the fifth and sixth transistors M5 and M6 may be turned on. Therefore, during the fourth period P4, the pixel 10 may emit light based on the data signal DVi supplied during the previous display-scan period.

In an embodiment, during the self-scan period, the data driver 500 may not supply the data signal DVi to the pixel unit 100. Therefore, power consumption may be further reduced.

Although, in FIGS. 2A to 3B, P-type transistors are described as being included in the pixels 10 and 10', the disclosure is not limited thereto, and at least one of the first to eighth transistors M1 to M8 may be an N-type transistor. Waveforms of scan signals or emission control signals supplied to respective transistors may change depending on the type of transistor.

FIGS. 4A to 4D are timing diagrams illustrating examples of start pulses supplied to an emission driver and a scan driver included in the display device depending on image refresh rates. FIG. 5 is a diagram illustrating an example of a method of driving a display device depending on image refresh rates.

Referring to FIGS. 1, 2A, 4A to 4D, and 5, the output frequency of the first gate start pulse GSP1 may vary depending on the image refresh rate RR.

In an embodiment, the pulse width of the emission start pulse ESP may be greater than those of the first and second gate pulses GSP1 and GSP2.

In an embodiment, regardless of the driving frequency, the timing controller 600 may output the emission start pulse ESP and the second gate start pulse GSP2 at a predetermined frequency (e.g., the first frequency). For example, the output frequency of the emission start pulse ESP and the second gate start pulse GSP2 may be set to about twice the maximum refresh rate of the display device 1000.

The timing controller 600 may output the first gate start pulse GSP1 at the same frequency (e.g., the second frequency) as that of the image refresh rate RR. One frame period of the display device 1000 may be determined by the output period of the first gate start pulse GSP1. For example, the one frame period of the display device 1000 may be determined according to the period of the scan signals supplied to the second, third, and eighth transistors (i.e., M2, M3, and M8 of FIG. 2A) of the pixel (e.g., 10 of FIG. 2A).

In an embodiment, during a display-scan period DSP, all of the emission start pulse ESP, the first gate start pulse GSP1, and the second gate start pulse GSP2 may be output. For example, during the display-scan period DSP, each of the pixels PX may perform driving of FIG. 3A. During the display-scan period DSP, each of the pixels PX may store data signals corresponding to an image to be displayed.

In an embodiment, during a self-scan period SSP, the emission start pulse ESP and the second gate start pulse GSP2 may be output. For example, during the self-scan period SSP, each of the pixels PX may perform driving of FIG. 3B. During the self-scan period SSP, a predetermined high voltage for applying a bias may be supplied to the first electrode and/or the second electrode of the first transistor (e.g., M1 of FIG. 2A) in each pixel (e.g., 10 of FIG. 2A).

In an embodiment, the length of a single display-scan period DSP may be substantially the same as that of a single self-scan period SSP. However, the number of self-scan periods SSP included in one frame period may be determined according to the image refresh rate RR.

Figure 4A:
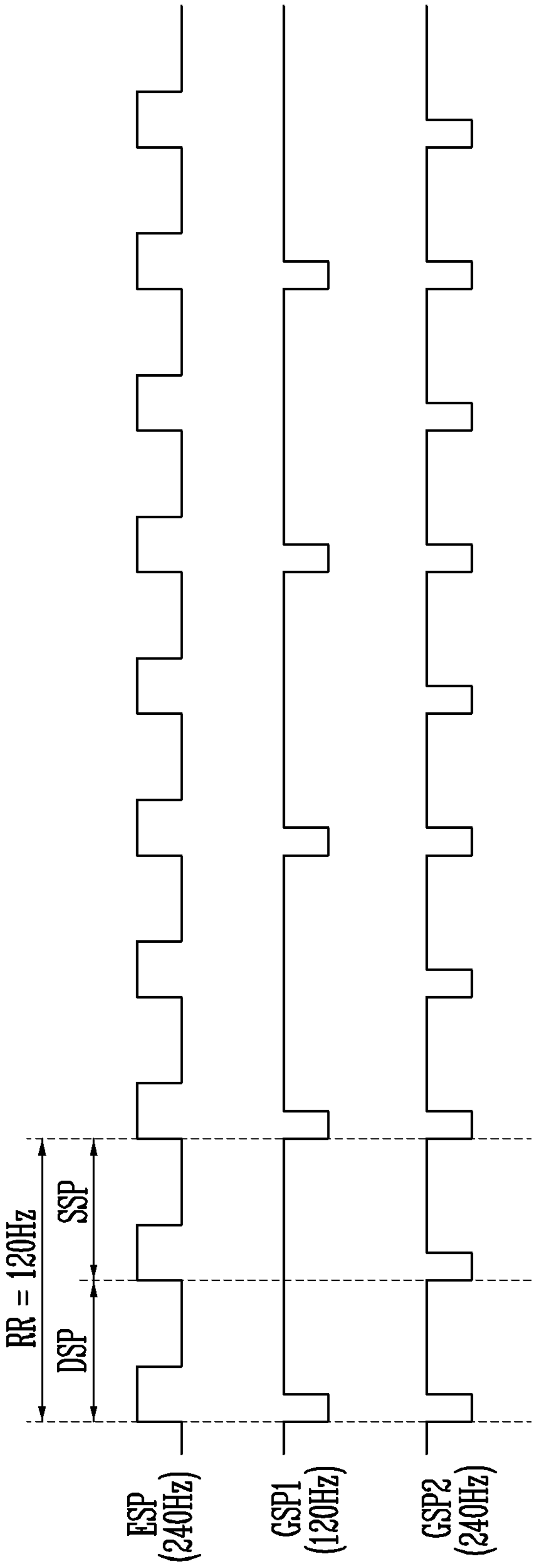
FIGS. 4A to 4D are timing diagrams illustrating examples of start pulses supplied to an emission driver and a scan driver included in the display device depending on image refresh rates.
Figure 5:
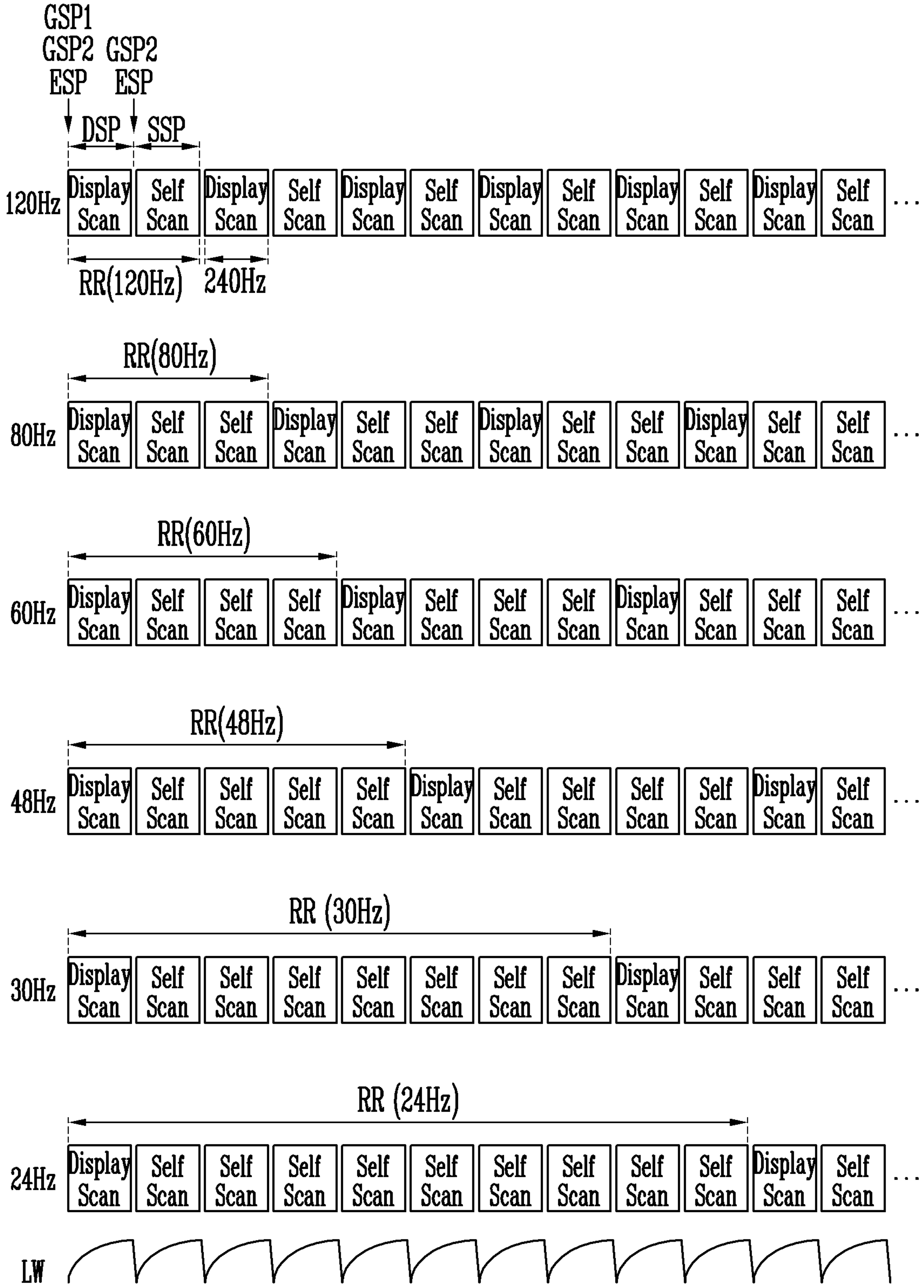
FIG. 5 is a diagram illustrating an example of a method of driving a display device depending on image refresh rates.

As illustrated in FIGS. 4A and 5, when the display device 1000 is driven at an image refresh rate RR of about 120 Hz, the number of first gate start pulses GSP1 supplied during one frame period may be about half the number of second gate start pulses GSP2. Therefore, at the image refresh rate RR of about 120 Hz, one frame period may include a single display-scan period DSP and a single self-scan period SSP.

The emission start pulse ESP may be supplied at the same frequency as the second gate start pulse GSP2. When the display device 1000 is driven at an image refresh rate RR of about 120 Hz, the pixels PX may alternately repeat emission and non-emission twice during the frame period.

Figure 4B:
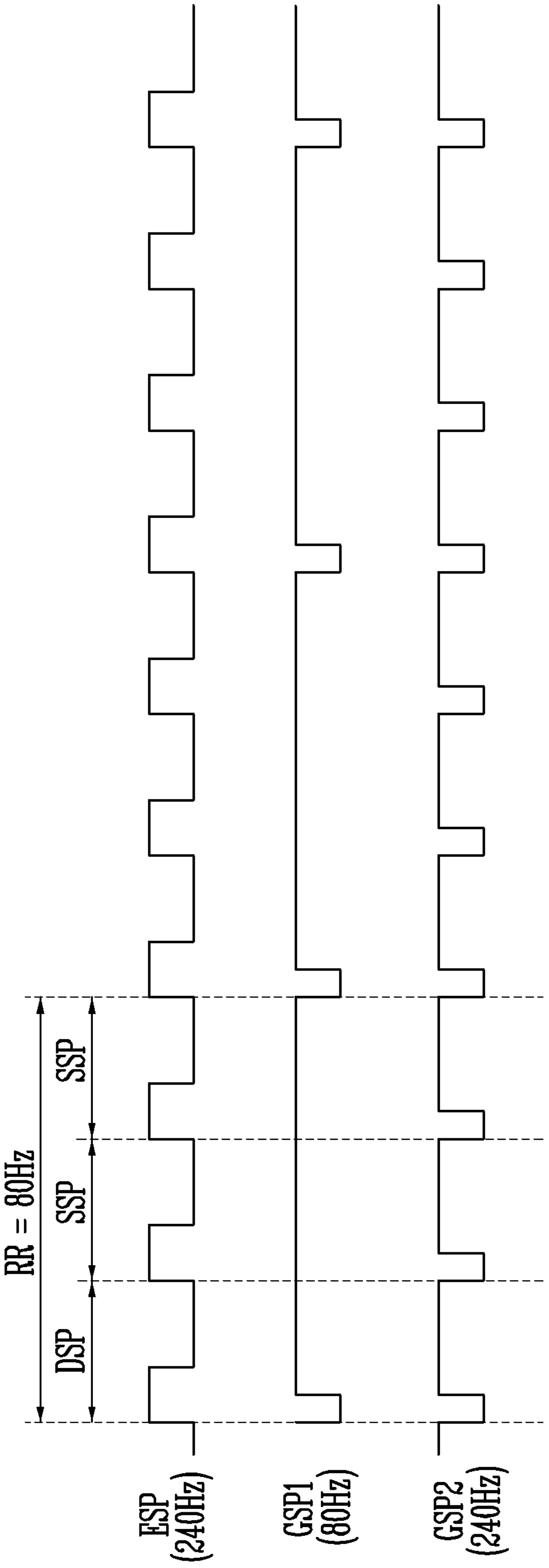

As illustrated in FIGS. 4B and 5, when the display device 1000 is driven at an image refresh rate RR of about 80 Hz, the number of first gate start pulses GSP1 supplied during one frame period may be about ⅓ of the number of second gate start pulses GSP2. Therefore, when the display device is driven at the image refresh rate RR of about 80 Hz, one frame period may include one display-scan period DSP and two consecutive self-scan periods SSP. Here, the pixels PX may alternately repeat emission and non-emission three times.

Figure 4C:
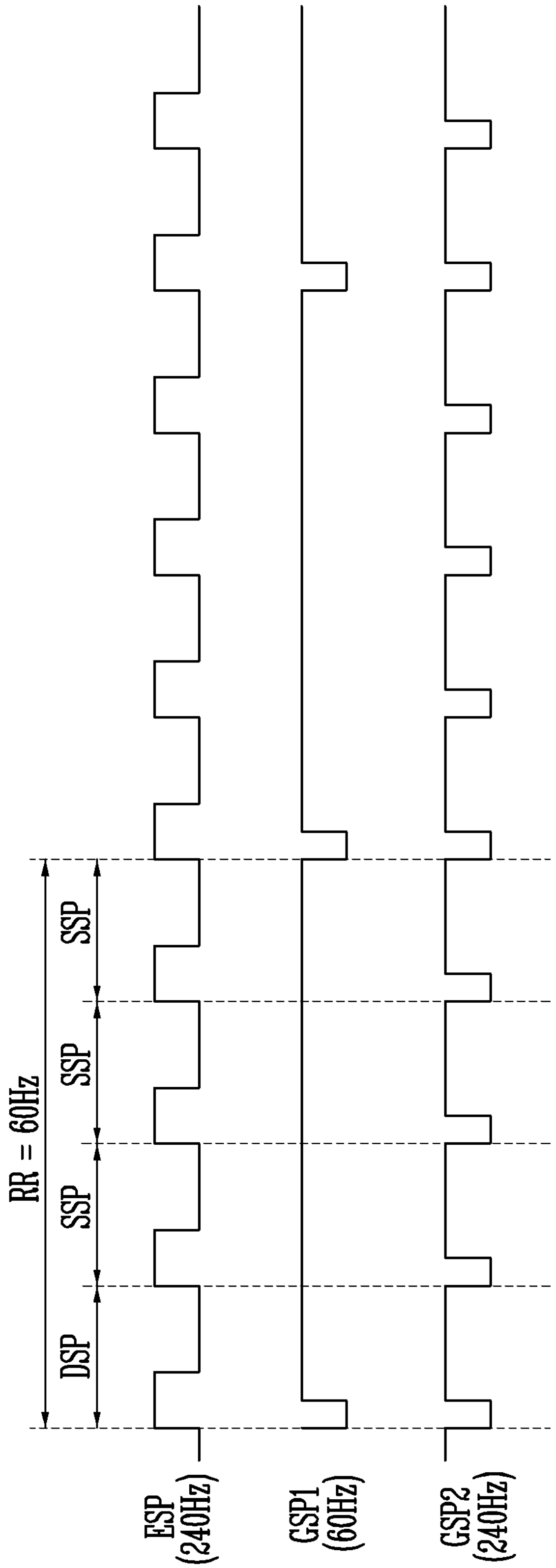

As illustrated in FIGS. 4C and 5, when the display device 1000 is driven at an image refresh rate RR of about 60 Hz, the number of first gate start pulses GSP1 supplied during one frame period may be about ¼ of the number of second gate start pulses GSP2. Therefore, when the display device is driven at the image refresh rate RR of about 60 Hz, one frame period may include one display-scan period DSP and three consecutive self-scan periods SSP. Here, the pixels PX may alternately repeat emission and non-emission four times.

Figure 4D:
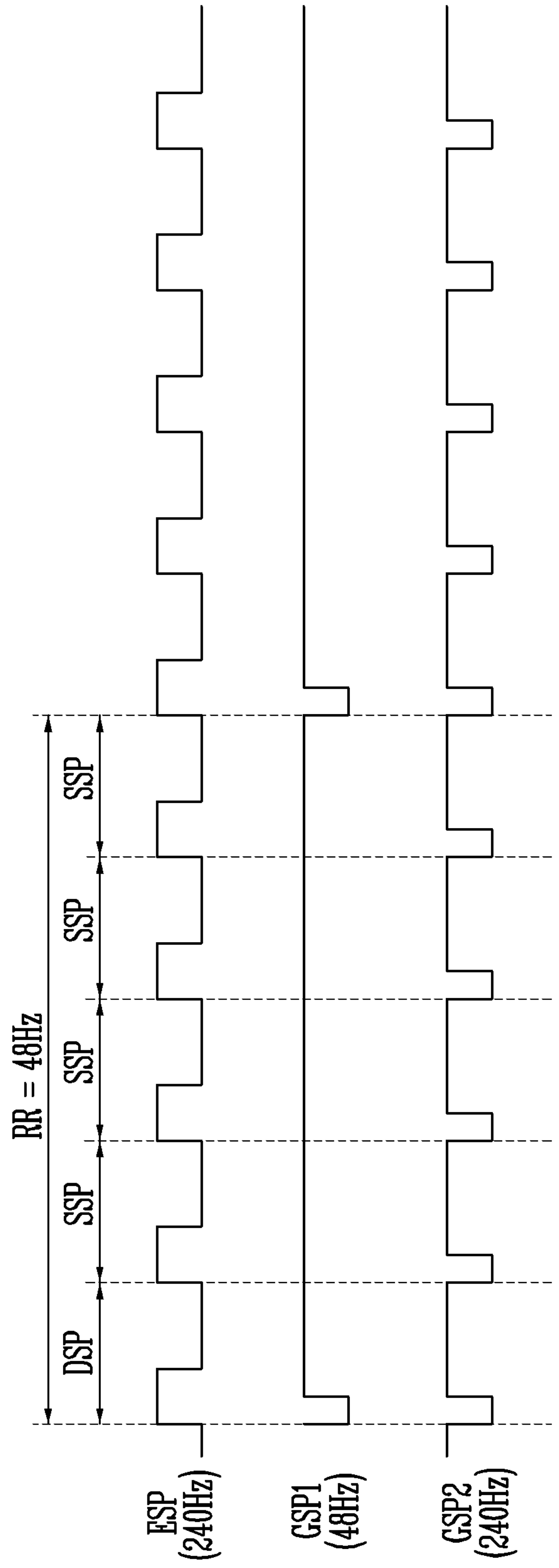

As illustrated in FIGS. 4D and 5, when the display device 1000 is driven at an image refresh rate RR of about 48 Hz, the number of first gate start pulses GSP1 supplied during one frame period may be about ⅕ of the number of second gate start pulses GSP2. Therefore, when the display device is driven at the image refresh rate RR of about 48 Hz, one frame period may include one display-scan period DSP and four consecutive self-scan periods SSP. Here, the pixels PX may alternately repeat emission and non-emission five times.

As illustrated in FIG. 5, a light wave LW detected through experiments from the pixel unit 100 may be output at the same period as the second gate start pulse GSP2.

Similar to the above method, the display device 1000 may be driven at various driving frequencies of about 60 Hz, about 30 Hz, about 24 Hz, about 12 Hz, about 8 Hz, about 6 Hz, about 5 Hz, about 4 Hz, about 3 Hz, about 2 Hz, about 1 Hz by adjusting the number of self-scan periods SSP included in one frame period. In other words, the display device 1000 may support various image refresh rates RR with frequencies corresponding to aliquots of the first frequency.

As the driving frequency decreases, the number of self-scan periods SSP increases, and thus an on-bias having a predetermined magnitude may be periodically applied to each of the first transistors M1 included in the pixel unit 100. Therefore, a decrease in luminance, a flicker (flickering) or an image blur occurring at low-frequency driving may be improved.

Figure 6:
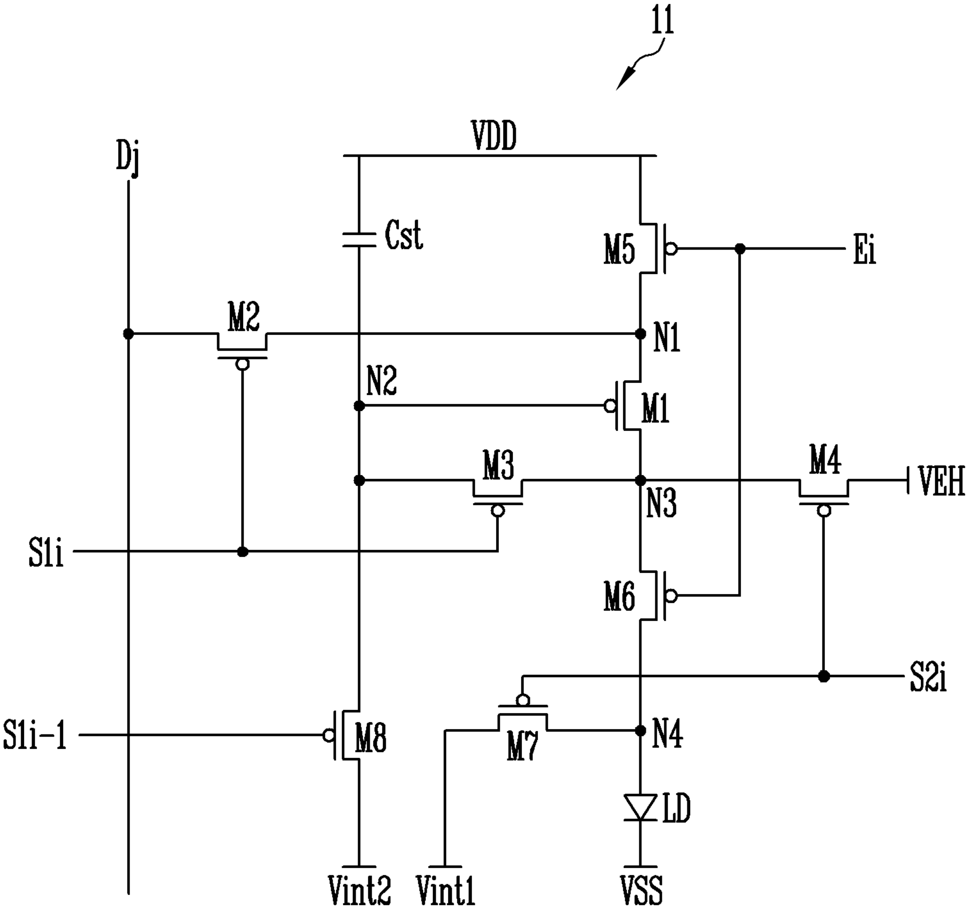
FIGS. 6 and 7 are equivalent circuit diagrams illustrating examples of the pixel included in the display device of FIG. 1.
Figure 7:
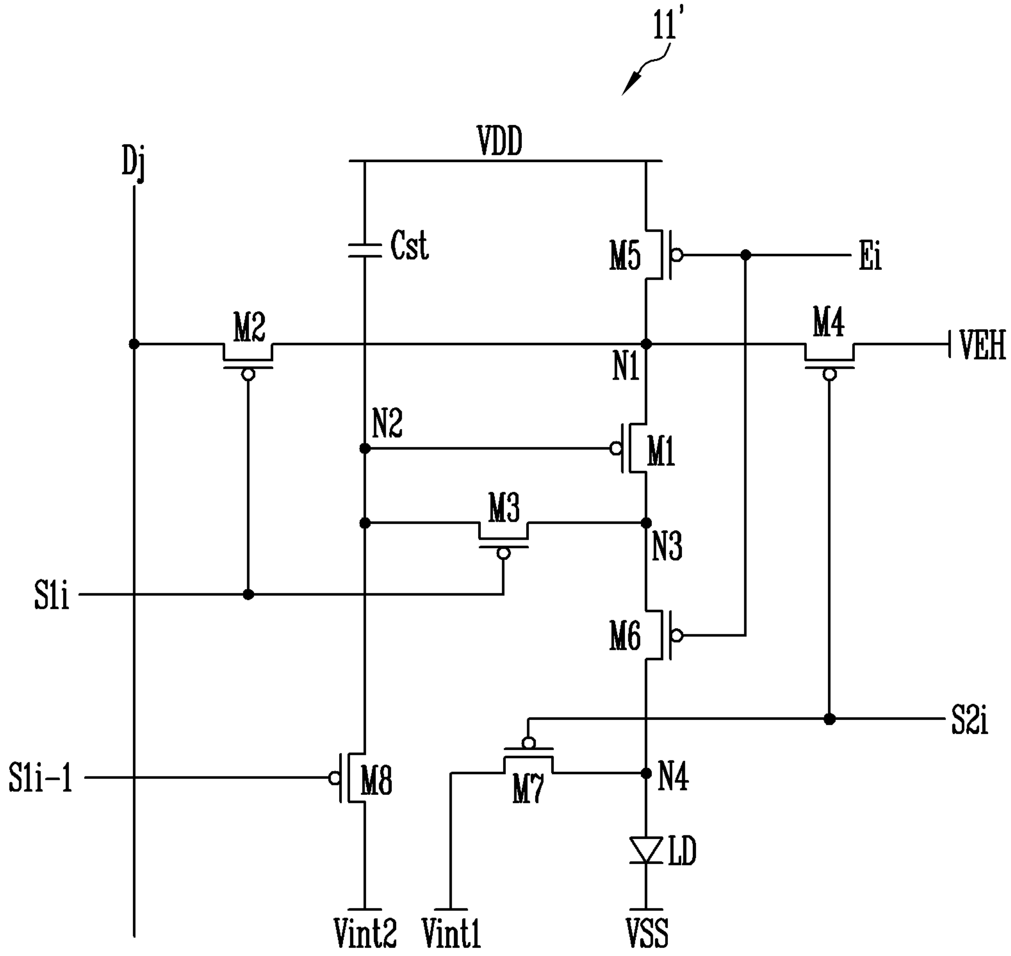

FIGS. 6 and 7 are equivalent circuit diagrams illustrating examples of the pixel included in the display device of FIG. 1.

Since pixels 11 and 11' of FIGS. 6 and 7 may be identical or similar to that of FIG. 2A except for the configuration of the fourth transistor, the same reference numerals are used to designate the same or corresponding component, and thus a repeated description thereof will be omitted.

Referring to FIGS. 6 and 7, each of the pixels 11 and 11' may include a light-emitting element LD, first to eighth transistors M1 to M8, and a storage capacitor Cst.

As illustrated in FIG. 6, the fourth transistor M4 may be electrically coupled or electrically connected between a predetermined bias power source VEH and a third node N3 (i.e., a drain electrode of the first transistor M1). The fourth transistor M4 may be turned on in response to a second scan signal supplied through a second scan line S2*i*.

The bias power source VEH may have a voltage level in a range of about 5 to about 8 V. Depending on the driving conditions of the display device 1000, the voltage level of the bias power source VEH may be easily controlled. The bias power source VEH may be implemented as a DC voltage source, and thus the bias difference between first transistors M1 may be further reduced.

As illustrated in FIG. 7, the fourth transistor M4 may also be electrically coupled or electrically connected between a predetermined bias power source VEH and a first node N1 (i.e., a source electrode of the first transistor M1). When one electrode of the fourth transistor M4 is electrically coupled or electrically connected to any one of the source electrode and the drain electrode of the first transistor M1, the first transistor M1 may be on-biased during a predetermined period.

In an embodiment, the pixels 11 and 11' of FIGS. 6 and 7 may display an image or images through the same driving as in the case of the timing diagrams of FIGS. 3A and 3B.

Figure 8:
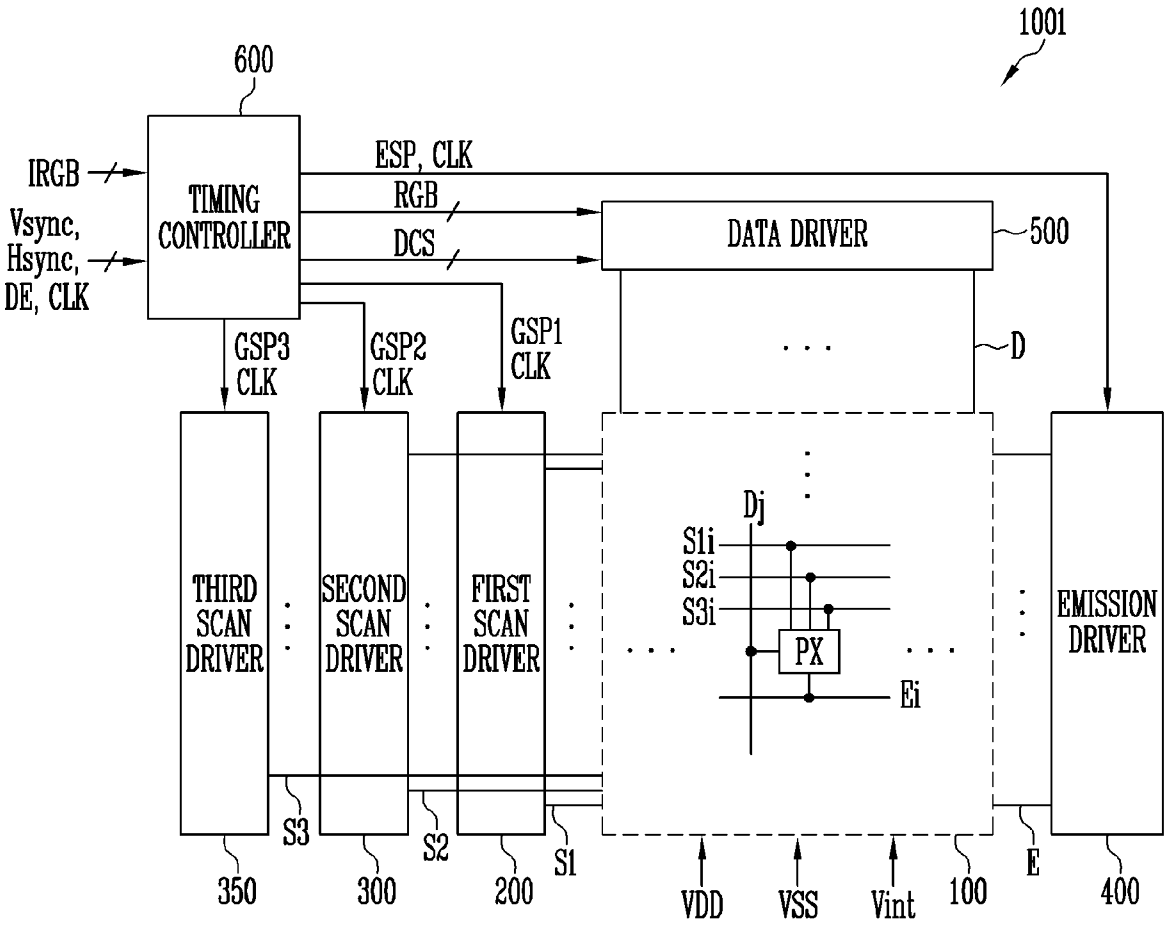
FIG. 8 is a block diagram illustrating an example of the display device of FIG. 1.

FIG. 8 is a block diagram illustrating an example of the display device of FIG. 1.

Since the display device of FIG. 8 may be identical or similar to that of FIG. 1 except for the configuration of a third scan driver 350, the same reference numerals are used to designate the same or corresponding components, and thus a repeated description thereof will be omitted.

Referring to FIG. 8, a display device 1001 may include a pixel unit 100, a first scan driver 200, a second scan driver 300, the third scan driver 350, an emission driver 400, a data driver 500, and a timing controller 600.

The timing controller 600 may supply gate start pulses GSP1, GSP2, and GSP3 and clock signals CLK to the first scan driver 200, the second scan driver 300, and the third scan driver 350 based on timing signals Vsync, Hsync, DE, and CLK.

The first gate start pulse GSP1 may control the first timing of a scan signal (e.g., a first scan signal) output from the first scan driver 200. The second gate start pulse GSP2 may control the first timing of a scan signal (e.g., a second scan signal) output from the second scan driver 300.

The third gate start pulse GSP3 may control the first timing of a scan signal (e.g., a third scan signal) output from the third scan driver 350.

In an embodiment, the pulse width of at least one of the first to third gate start pulses GSP1 to GSP3 may differ from that of the remaining gate start pulses. Therefore, the widths of scan signals corresponding to respective gate start pulses may also vary.

The data driver 500 may supply data signals to data lines D in response to a data driving control signal DCS. The data signals supplied through the data lines D may be supplied to pixels PX selected by the scan signals.

The first scan driver 200 may supply the scan signals to the first scan lines S1 in response to the first gate start pulse GSP1. The first scan driver 200 may supply the scan signals to the first scan lines S1 at a second frequency corresponding to an image refresh rate. The first scan driver 200 may output the scan signals only during a display-scan period.

The second scan driver 300 may supply the scan signals to the second scan lines S2 in response to the second gate start pulse GSP2. In an embodiment, the second scan driver 300 may supply scan signals to the second scan lines S2 at a first frequency unrelated to the refresh rate. For example, the second scan driver 300 may output the scan signals during a display-scan period and a self-scan period.

The third scan driver 350 may supply the scan signals to the third scan lines S3 in response to the third gate start pulse GSP3. The third scan driver 350 may supply the scan signals to the third scan lines S3 at the second frequency.

The emission driver 400 may supply emission control signals to emission control lines E in response to an emission start pulse ESP. The emission driver 400 may supply the emission control signals to the emission control lines E at the first frequency. For example, the emission driver 400 may output the scan signals during the display-scan period and the self-scan period.

However, since this is only exemplary, some of the first to third scan drivers 200, 300, and 350 may be driven at the first frequency, and the remaining scan drivers may be driven at the second frequency depending on the structure of the pixel PX. Scan drivers may be excluded or added depending on the structure of the pixel PX.

Figure 9:
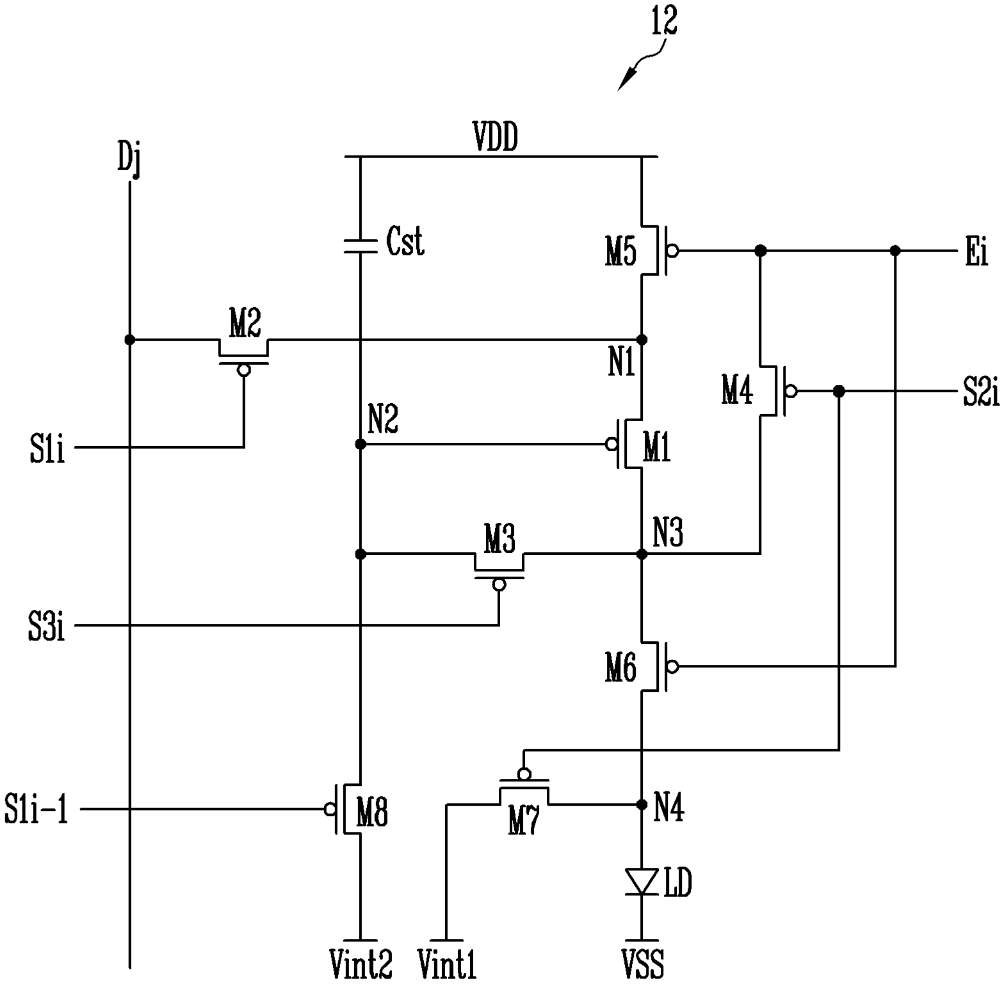
FIG. 9 is an equivalent circuit diagram illustrating an example of a pixel included in the display device of FIG. 8.
Figure 10:
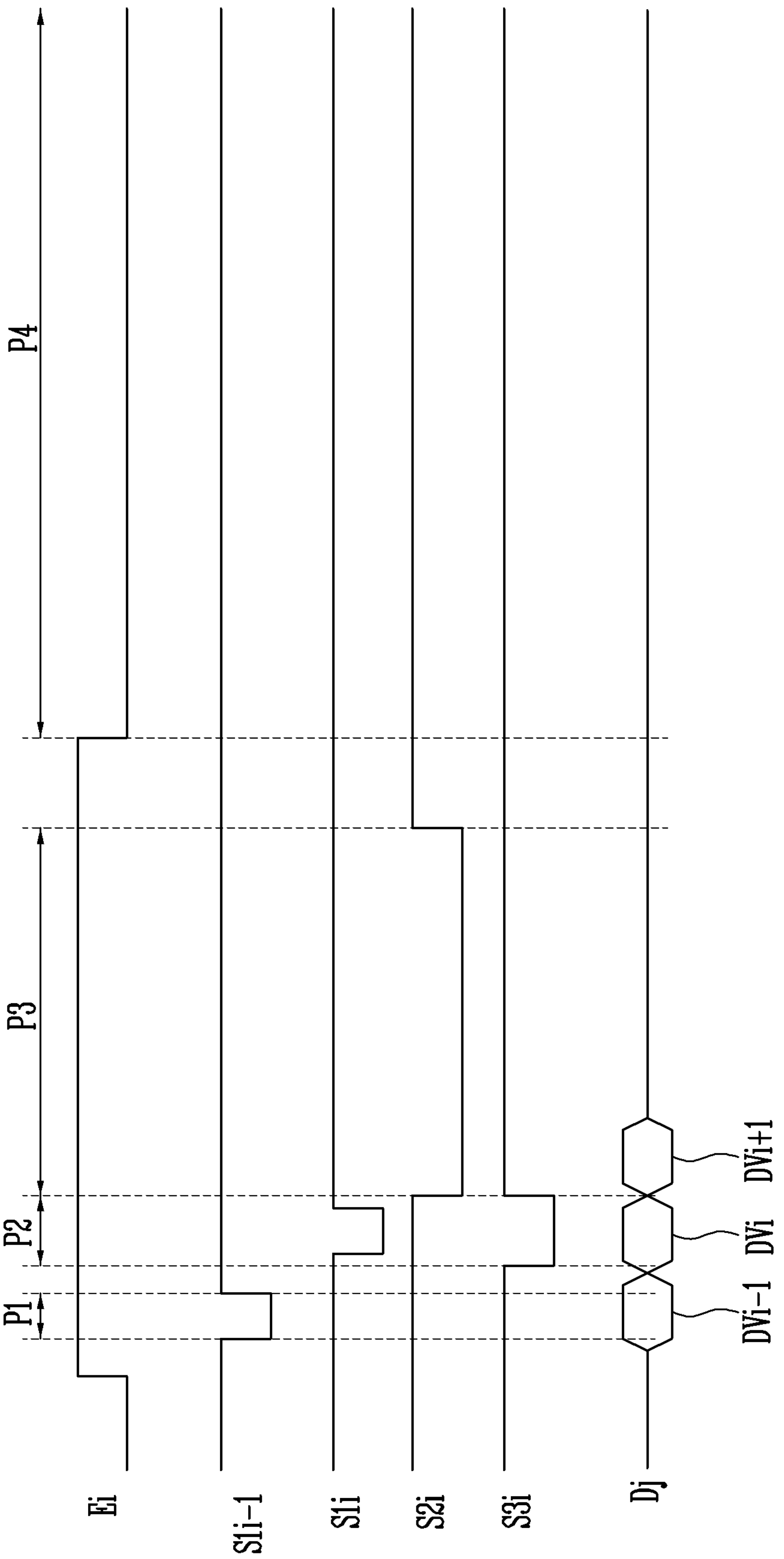
FIG. 10 is a timing diagram illustrating an example of driving of the pixel of FIG. 9.

FIG. 9 is an equivalent circuit diagram illustrating an example of the pixel included in the display device of FIG. 8, and FIG. 10 is a timing diagram illustrating an example of driving of the pixel of FIG. 9.

Since a pixel of FIG. 9 may be identical or similar to that of FIG. 2A except for some coupling components of the third transistor, the same reference numerals are used to designate the same or corresponding components, and thus a repeated description thereof will be omitted. Since the timing diagram of FIG. 10 may be identical or similar to that of FIG. 3A except for the width of a signal supplied through a third scan line S3*i*, a repeated description thereof will be omitted.

Referring to FIGS. 9 and 10, a pixel 12 may include a light-emitting element LD, first to eighth transistors M1 to M8, and a storage capacitor Cst.

In an embodiment, the third transistor M3 and the second transistor M2 may be controlled in response to different scan signals. For example, a gate electrode of the third transistor M3 may be electrically coupled or electrically connected to the third scan line S3*i*, and the third transistor M3 may be turned on in response to a third scan signal supplied through the third scan line S3*i*.

During a display-scan period, the pixel 12 may perform operations corresponding to first to fourth periods P1 to P4. In an embodiment, the third scan signal supplied through the third scan line S3*i* may overlap a first scan signal supplied through a first scan line S1*i*. The pulse width of the third scan signal may be greater than that of the first scan signal, and the length of a second period P2 during which data writing and threshold voltage compensation are performed may increase.

For example, as a turn-on period of the third transistor M3 increases, a time required for threshold voltage compensation may increase. Before data writing, the difference between the gate voltage and the source voltage of the first transistor M1 may decrease. Therefore, image quality may be further improved.

Figure 11:
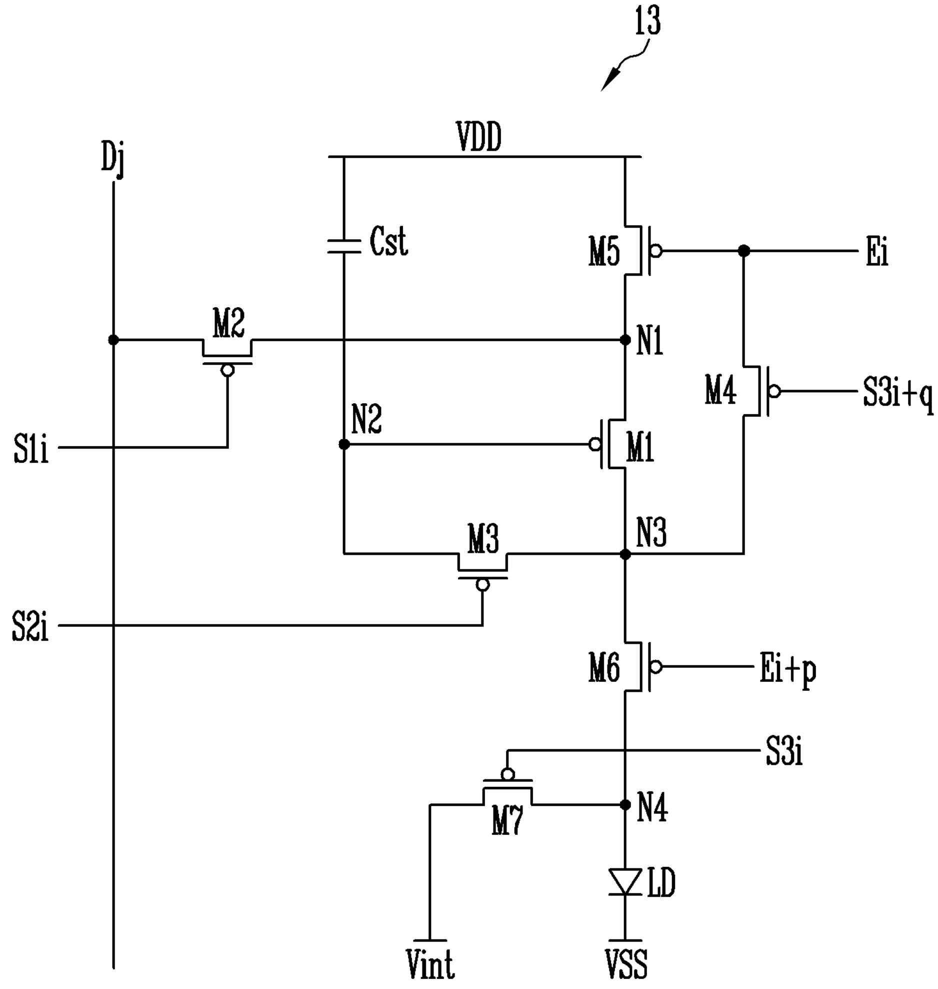
FIG. 11 is an equivalent circuit diagram illustrating an example of the pixel included in the display device of FIG. 8.

FIG. 11 is an equivalent circuit diagram illustrating an example of the pixel included in the display device of FIG. 8.

Referring to FIG. 11, a pixel 13 may include a light-emitting element LD, first to seventh transistors M1 to M7, and a storage capacitor Cst.

Since the configuration of the light-emitting element LD, the first transistor M1, and the second transistor M2 may be substantially the same as that of the pixel 10 of FIG. 2A, a repeated description thereof will be omitted.

The third transistor M3 may be electrically coupled or electrically connected between a second electrode of the first transistor M1 (i.e., a third node N3) and a second node N2. A gate electrode of the third transistor M3 may be electrically coupled or electrically connected to an i-th second scan line S2*i*. When a scan signal is supplied through the i-th second scan line S2*i*, the third transistor M3 may be turned on, and may then electrically connect or couple the second electrode of the first transistor M1 to the second node N2. Therefore, when the third transistor M3 is turned on, the first transistor M1 may be electrically coupled or electrically connected in a diode configuration.

In an embodiment, in a state in which the second transistor M2 is turned off and the third transistor M3 is turned on, the voltage of an initialization power source Vint may be supplied to the gate electrode of the first transistor M1 through the third transistor M3.

The fourth transistor M4 may be electrically coupled or electrically connected between the third node N3 and an i-th emission control line Ei. A gate electrode of the fourth transistor M4 may be electrically coupled or electrically connected to an i+q-th third scan line S3*i+q*. The fourth transistor M4 may be turned on when a scan signal (e.g., a third scan signal) is supplied through the i+q-th third scan line S3*i+q* (where q is a natural number), and may then supply the voltage of the i-th emission control line Ei to the third node N3. For example, the gate electrode of the fourth transistor M4 may be electrically coupled or electrically connected to an i+5-th third scan line S3*i*+5. The third scan signal supplied through the i+5-th third scan line S3*i*+5 may be a signal obtained by delaying a third scan signal, which may be supplied through the i-th third scan line S3*i*, by 5 horizontal periods (5H). However, this is merely exemplary, and the third scan line S3*i+q* electrically coupled or electrically connected to the gate electrode of the fourth transistor M4 is not limited thereto.

Here, a gate-off voltage (or a logic high voltage) may be supplied through the i-th emission control line Ei. For example, the gate-off voltage may be in a range of about 5 to about 7 V.

Accordingly, a predetermined high voltage may be applied to the drain electrode (and the source electrode) of the first transistor M1 by the turn-on operation of the fourth transistor M4, and the first transistor M1 may have an on-bias state.

The fifth transistor M5 may be electrically coupled or electrically connected between a first power source VDD and the first node N1. A gate electrode of the fifth transistor M5 may be electrically coupled or electrically connected to the i-th emission control line Ei. The fifth transistor M5 may be turned off in a case where the emission control signal may be supplied through the i-th emission control line Ei, and may be turned on in the remaining cases.

The sixth transistor M6 may be electrically coupled or electrically connected between the second electrode of the first transistor M1 (i.e., the third node N3) and the first electrode of the light-emitting element LD (i.e., the fourth node N4). A gate electrode of the sixth transistor M6 may be electrically coupled or electrically connected to an i+p-th emission control line Ei+p (where p is a natural number). The sixth transistor M6 may be turned off in a case where the emission control signal may be supplied through the i+p-th emission control line Ei+p, and may be turned on in the remaining cases. Therefore, the turn-on periods of the fifth transistor M5 and the sixth transistor M6 may merely partially overlap each other.

For example, the gate electrode of the sixth transistor M6 may be electrically coupled or electrically connected to an i+4-th emission control line Ei+4. The emission control signal supplied through the i+4-th emission control line Ei+4 may be a signal obtained by delaying the emission control signal supplied through the i-th emission control line Ei by 4 horizontal periods (4H). However, this is merely exemplary, and the emission control line Ei+p electrically coupled or electrically connected to the gate electrode of the sixth transistor M6 is not limited thereto.

The seventh transistor M7 may be electrically coupled or electrically connected between the first electrode (i.e., the fourth node N4) of the light-emitting element LD and the initialization power source Vint. A gate electrode of the seventh transistor M7 may be electrically coupled or electrically connected to the i-th third scan line S3*i*. The seventh transistor M7 may be turned on when the emission control signal is supplied through the i-th third scan line S3*i*, and may then supply the voltage of the initialization power source Vint to the first electrode of the light-emitting element LD and the fourth node N4.

In an embodiment, the turn-on periods of the seventh transistor M7 and the sixth transistor M6 may not overlap each other.

In an embodiment, the fourth to seventh transistors M4 to M7 may be turned on at a first frequency, and the second and third transistors M2 and M3 may be turned on at a second frequency different from that of the first frequency. For example, the second frequency may be lower than the first frequency. For example, the second frequency may be an aliquot of the first frequency.

Since the pixel 13 of FIG. 11 includes fewer transistors less than that of the pixel of FIG. 2A, a layout of the pixel may be simplified, and the implementation of high resolution may be facilitated.

Figure 12A:
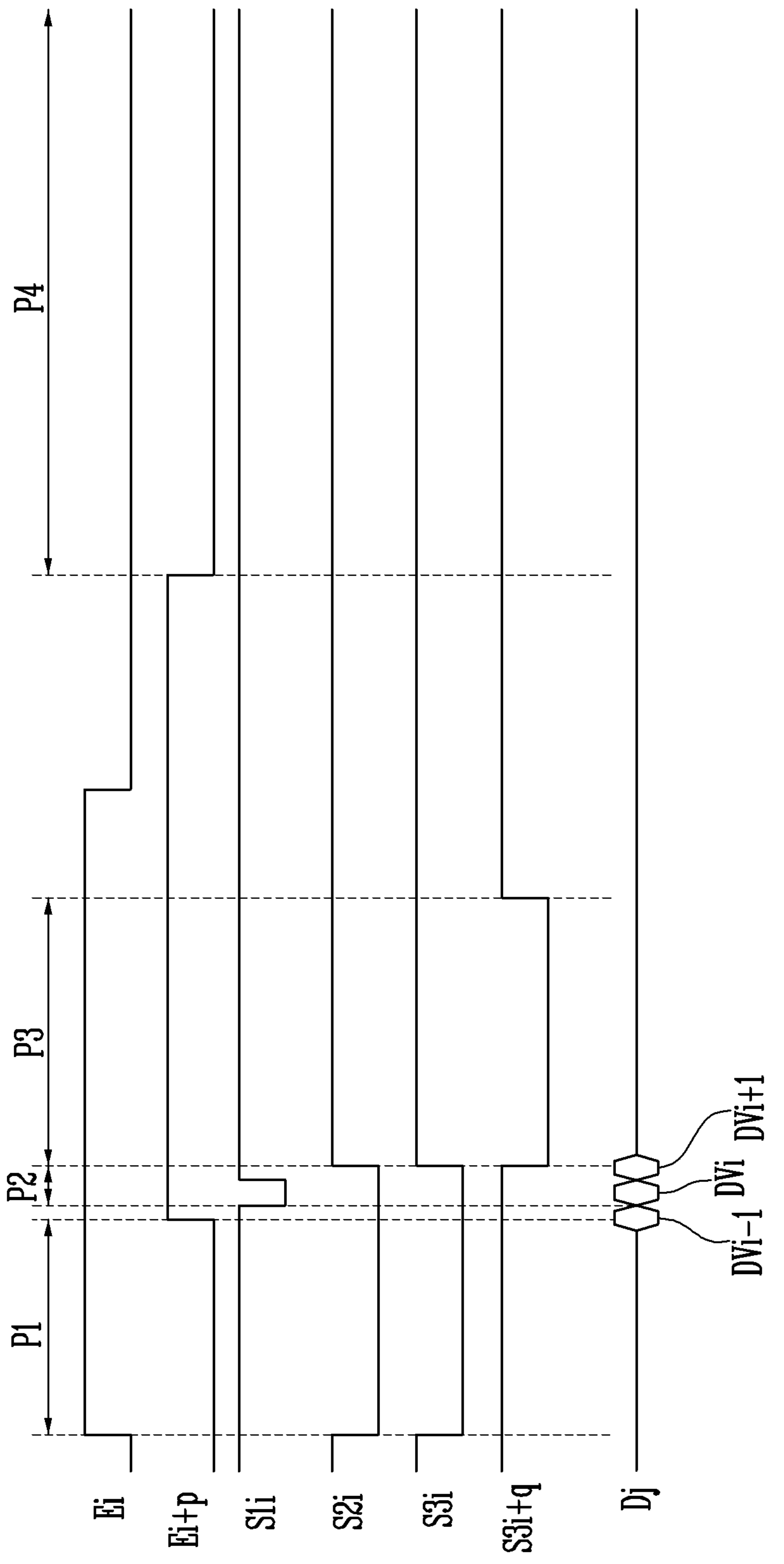
FIG. 12A is a timing diagram illustrating an example of driving of the pixel of FIG. 11.

FIG. 12A is a timing diagram illustrating an example of driving of the pixel of FIG. 11.

Referring to FIGS. 11 and 12A, the pixel 13 may be supplied with signals for displaying an image during a display-scan period. The display-scan period may include a period during which a data signal DVi corresponding to an output image may be written.

Hereinafter, for convenience of description, a description may be made such that an i-th emission control line Ei may be used as an emission control line Ei, an i+p-th emission control line Ei+p may be used a subsequent emission control line Ei+p, an i-th first scan line S1*i* may be used as a first scan line S1*i*, an i-th second scan line S2*i* may be used as a second scan line S2*i*, an i-th third scan line S3*i* may be used as a third scan line S3*i*, and an i+q-th third scan line S3*i+q* may be used as a subsequent third scan line S3*i+q*.

During the first period P1, the emission control signal may be supplied through the emission control line Ei, the second scan signal may be supplied through the second scan line S2*i*, and the third scan signal may be supplied through the third scan line S3*i*. The fifth transistor M5 may be turned off in response to the emission control signal. Since the second scan signal may be supplied through the second scan line S2*i* and the third scan signal may be supplied through the third scan line S3*i*, the third and seventh transistors M3 and M7 may be turned on. Since an emission control signal may not be supplied through the subsequent emission control line Ei+p, the sixth transistor M6 may remain turned on.

During the first period P1, the supply of a driving current to the light-emitting element LD may be stopped. When the seventh transistor M7 is turned on, the voltage of the initialization power source Vint may be supplied to the fourth node N4. For example, the voltage of the initialization power source Vint may be supplied to the gate electrode (i.e., the second node N2) of the first transistor M1 through the third and sixth transistors M3 and M6 that may be turned on.

Therefore, during the first period P1, the initialization of the voltage on the first electrode of the light-emitting element LD (i.e., discharging of a parasitic capacitor) and the initialization of the gate voltage of the first transistor M1 may be performed. For example, the first period P1 may be an initialization period.

After the first period P1, the supply of the emission control signal to the subsequent emission control line Ei+p starts, and the sixth transistor M6 may be turned off. During the first period P1, the fifth transistor M5 may be turned off, and the sixth transistor M6 may be turned on. For example, the length of the first period P1 may be about 4 horizontal periods (4H) or more.

Thereafter, the first scan signal may be supplied through the first scan line S1*i* during the second period P2. The second transistor M2 may be turned on, so that an i-th data signal DVi may be supplied to the first node N1 through the data line Dj. Since the third transistor M3 may be in a turned-on state, the first transistor M1 may be electrically coupled or electrically connected in a diode configuration. For example, the second period P2 may be a data writing and threshold voltage compensation period.

Thereafter, the supply of the second scan signal to the second scan line S2*i* may be stopped, and the supply of the third scan signal to the third scan line S3*i* may be stopped. Accordingly, the third and seventh transistors M3 and M7 may be turned off. In an embodiment, the third and seventh transistors M3 and M7 may be simultaneously controlled.

During the third period P3, the third scan signal may be supplied through the subsequent third scan line S3*i+q*. The fourth transistor M4 may be turned on in response to the third scan signal. When the fourth transistor M4 is turned on, a gate-off voltage (e.g., a logic high voltage) of the emission control signal may be supplied to the third node N3. During the third period P3, the first transistor M1 may be on-biased. In an embodiment, the third scan signal may have a pulse width of about 4 horizontal periods (4H) or more. Therefore, for a sufficient period of time, the logic high voltage of the emission control signal may be supplied to the first transistor M1.

Meanwhile, a turn-on period of the third transistor M3 and a turn-on period of the fourth transistor M4 may not overlap each other. For example, the initialization/compensation period and the bias period of the first transistor M1 may be separated from each other. A turn-on period of the fourth transistor M4 and a turn-on period of the seventh transistor M7 may not overlap each other.

Thereafter, the supply of emission control signals to the emission control line Ei and the subsequent emission control line Ei+p may be sequentially stopped, and the fifth and sixth transistors M5 and M6 may be sequentially turned on. When the fifth and sixth transistors M5 and M6 are turned on, a driving current generated based on the data signal DVi may be supplied to the light-emitting element LD, and the light-emitting element LD may emit light with luminance corresponding to the driving current. The fourth period P4 during which both the fifth and sixth transistors M5 and M6 may be turned on may be an emission period.

An operation corresponding to the display-scan period may be implemented in accordance with the frequency of the scan signals supplied to the first scan line S1*i*. For example, the display-scan period may be represented by the above-described second frequency.

Figure 12B:
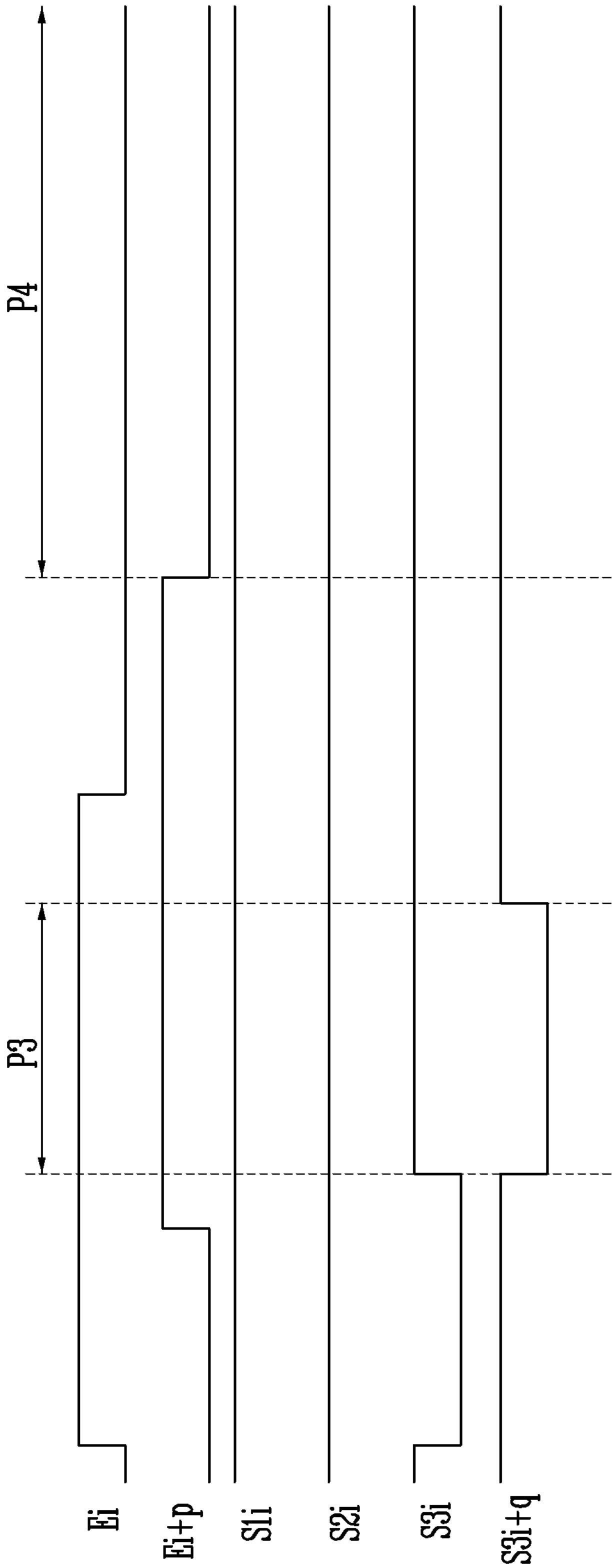
FIG. 12B is a timing diagram illustrating an example of driving of the pixel of FIG. 11.

FIG. 12B is a timing diagram illustrating an example of driving of the pixel of FIG. 11.

Referring to FIGS. 11 and 12B, in order to maintain the luminance of an image that may be output during the display-scan period, an emission control signal may be applied to one electrode (e.g., the drain electrode or the third node N3) of the first transistor M1 during a self-scan period.

The self-scan period may include a bias period (e.g., the third period P3) and an emission period (e.g., the fourth period P4). In an embodiment, an operation corresponding to the self-scan period may be substantially the same as that of the display-scan period except that a first scan signal and a second scan signal may not be supplied.

During the self-scan period, scan signals may not be supplied to the second and third transistors M2 and M3. For example, during the self-scan period, the first scan signal supplied through the first scan line S1*i* may have a gate-off voltage (e.g., a logic high voltage).

Since the second and third transistors M2 and M3 remain turned off, the gate voltage of the first transistor M1 may not be influenced by the driving of the self-scan period.

For example, the fourth to seventh transistors M4 to M7 may be turned on at a first frequency, and the second and third transistors M2 and M3 may be turned on at a second frequency that may be different from that of the first frequency. For example, the second frequency may be lower than the first frequency.

During the third period P3 of the self-scan period, the third scan signal may be supplied through the third scan lines S3*i* and S3*i+q*. The fourth transistor M4 may be turned on in response to the third scan signal. When the fourth transistor M4 is turned on, a logic high voltage of the emission control signal may be supplied to the third node N3. Accordingly, since an on-bias may be applied to the first transistor M1 during the third period P3, a flicker occurring at low-frequency driving may be improved.

Thereafter, during the fourth period P4, the fifth and sixth transistors M5 and M6 may be turned on. Therefore, during the fourth period P4, the pixel 13 may emit light based on the data signal DVi supplied during the previous display-scan period.

Figure 13:
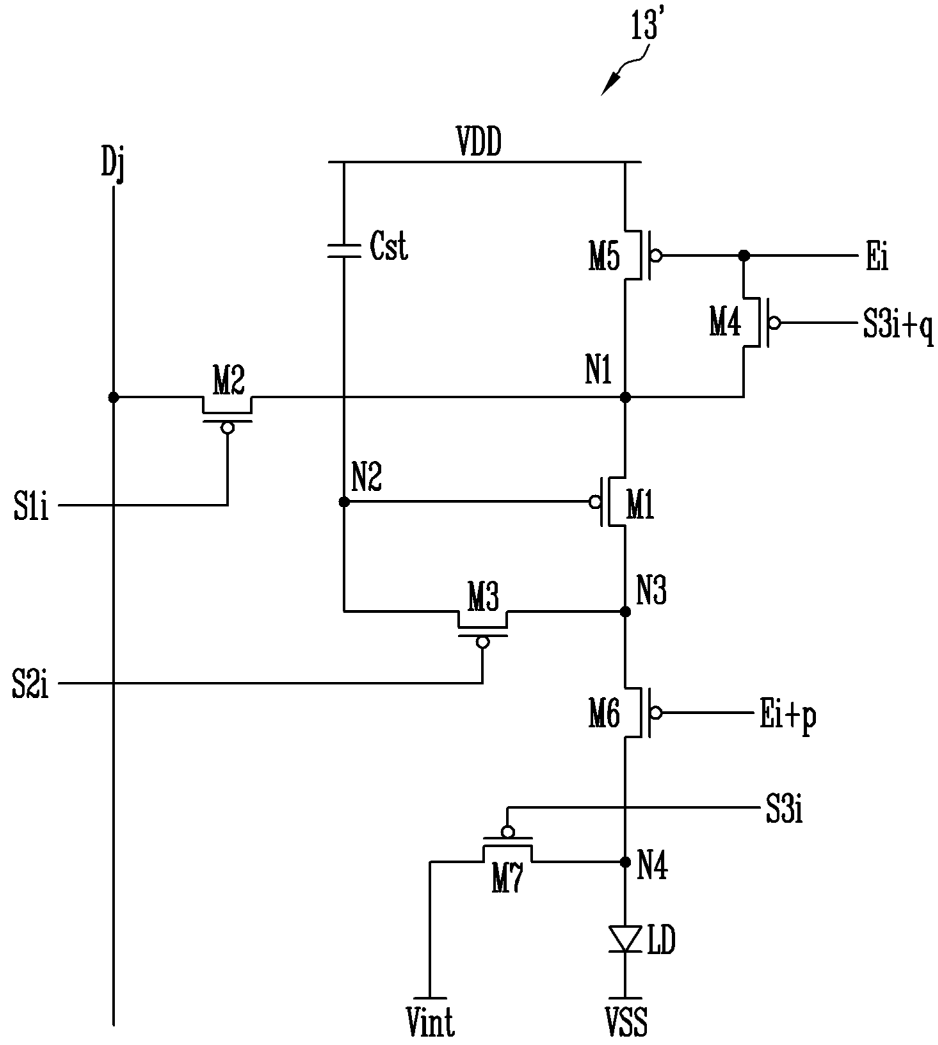
FIGS. 13 to 15 are equivalent circuit diagrams illustrating modifications of the pixel of FIG. 11.
Figure 14:
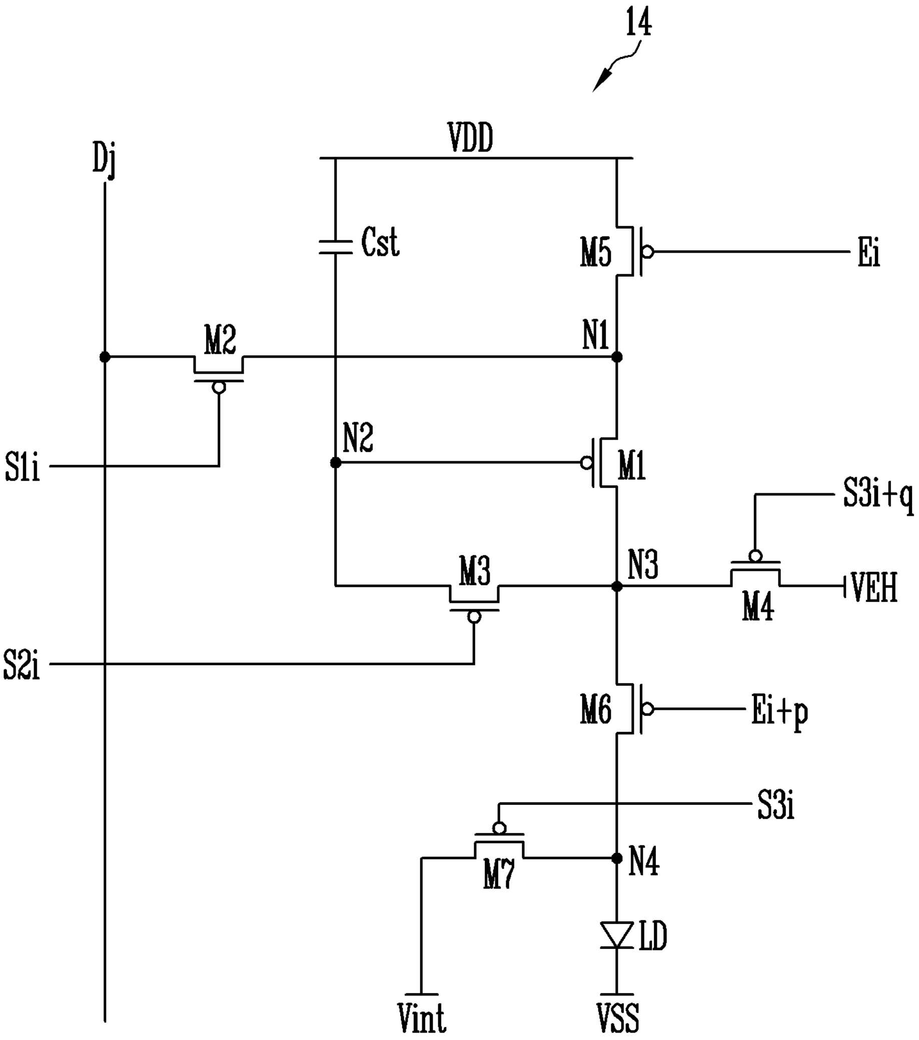
Figure 15:
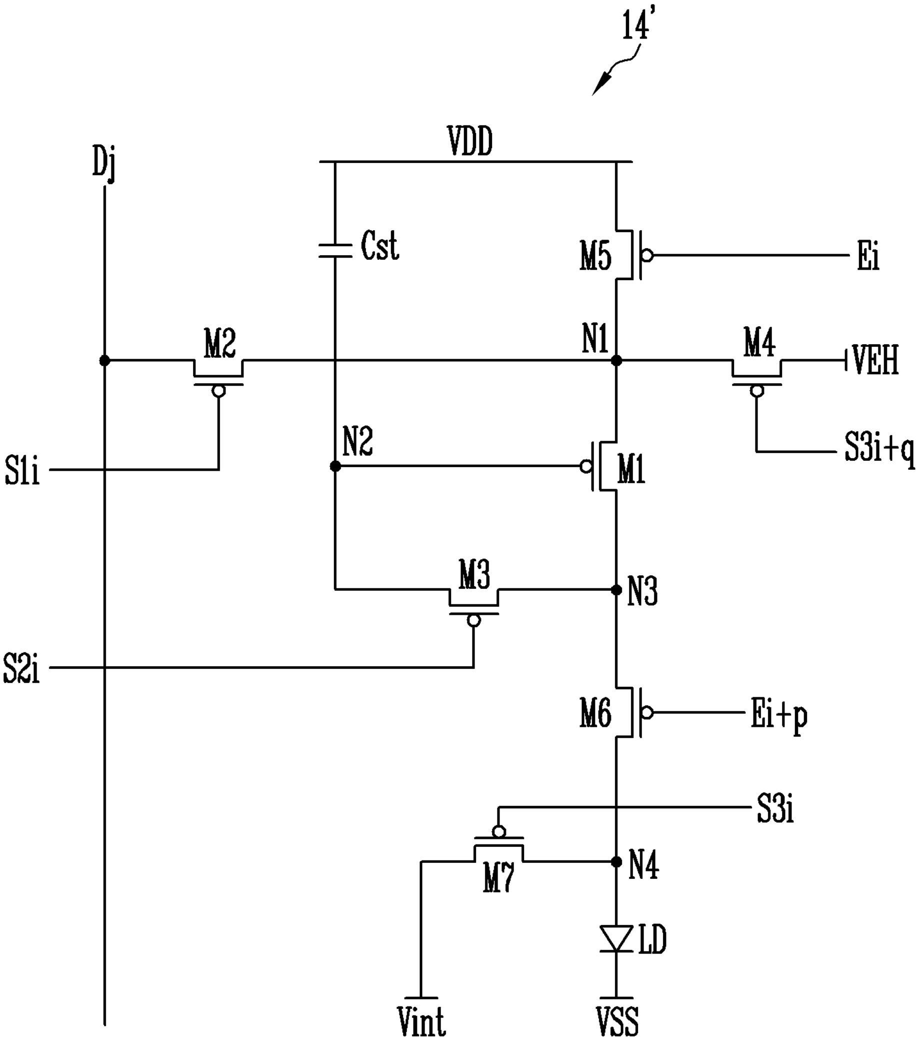

FIGS. 13 to 15 are equivalent circuit diagrams illustrating modifications of the pixel of FIG. 11.

Since pixels 13', 14, and 14' of FIGS. 13 to 15 may be identical or similar to that of FIG. 2A except for the configuration of the fourth transistor, the same reference numerals are used to designate the same or corresponding components, and thus a repeated description thereof will be omitted.

Referring to FIGS. 13 to 15, each of the pixels 13', 14, and 14' may include a light-emitting element LD, first to seventh transistors M1 to M7, and a storage capacitor Cst.

As illustrated in FIG. 13, the pixel 13' may include the fourth transistor M4 electrically coupled or electrically connected between an i-th emission control line Ei and a first node N1. When the fourth transistor M4 is turned on, a logic high voltage may be supplied, as a bias voltage, to the source electrode of the first transistor M1, and the first transistor M1 may have an on-bias state.

As illustrated in FIG. 14, the fourth transistor M4 of the pixel 14 may be electrically coupled or electrically connected between a bias power source VEH and a third node N3 (i.e., the drain electrode of the first transistor M1). The fourth transistor M4 may be turned on in response to a third scan signal supplied through an i+q-th third scan line S3*i+q*.

When the fourth transistor M4 is turned on, the voltage of the bias power source VEH may be supplied, as a bias voltage, to the drain electrode of the first transistor M1, and the first transistor M1 may have an on-bias state.

As illustrated in FIG. 15, the fourth transistor M4 of the pixel 14' may be electrically coupled or electrically connected between the bias power source VEH and the first node N1 (i.e., the source electrode of the first transistor M1). The fourth transistor M4 may be turned on in response to a third scan signal supplied through the i+q-th third scan line S3*i+q*.

The pixels 13', 14, and 14' of FIGS. 13 to 15 may display an image or images through the driving of FIGS. 12A and 12B.

FIGS. 16 to 19 are equivalent circuit diagrams illustrating modifications of the pixel of FIG. 11.

Since pixels 15, 15', 16, and 16' of FIGS. 16 to 19 may be identical to those of FIGS. 11, 13, 14, and 15, respectively, except for the coupling relationship between the third transistor M3 and the seventh transistor M7, the same reference numerals are used to designate identical or corresponding components, and repeated descriptions thereof will be omitted.

Referring to FIGS. 16 to 19, each of the pixels 15, 15', 16, and 16' may include a light-emitting element LD, first to seventh transistors M1 to M7, and a storage capacitor Cst.

In an embodiment, a gate electrode of the third transistor M3 and a gate electrode of the seventh transistor M7 may be electrically coupled or electrically connected in common to a second scan line S2*i*. Therefore, the third transistor M3 and the seventh transistor M7 may be controlled in common. Since the second scan signal supplied through the second scan line S2*i* may be driven at a second frequency corresponding to the image frame rate, the third and seventh transistors M3 and M7 may be turned on at the second frequency.

A gate electrode of the fourth transistor M4 may be electrically coupled or electrically connected to an i+q-th third scan line S3*i+q* for supplying a third scan signal. The fourth transistor M4 may be turned on at the first frequency in a way similar to that of the fifth and sixth transistors M5 and M6. For example, an on-bias may be supplied to the first transistor M1 at the first frequency.

In other words, the seventh transistor may be turned on at the second frequency, but the fourth transistor M4 may be turned on at the first frequency so as to supply an on-bias voltage during both a display-scan period and a self-scan period. For example, the third scan signal may be supplied at the first frequency, and the second scan signal may be supplied at the second frequency lower than the first frequency. The second frequency, for example, may be different from that of the first frequency.

In an embodiment, the third scan signal may have the same waveform as the second scan signal, and a third scan signal supplied through the i+q-th third scan line S3*i+q* may correspond to a signal obtained by delaying the second scan signal supplied through the i-th second scan line S2*i* by q horizontal periods (qH). However, this is merely exemplary, and the pulse width of the third scan signal and the pulse width of the second scan signal may differ from each other. For example, the second scan signal may be supplied during about 5 horizontal periods (5H), and the third scan signal may be supplied during 6 H.

Figure 16:
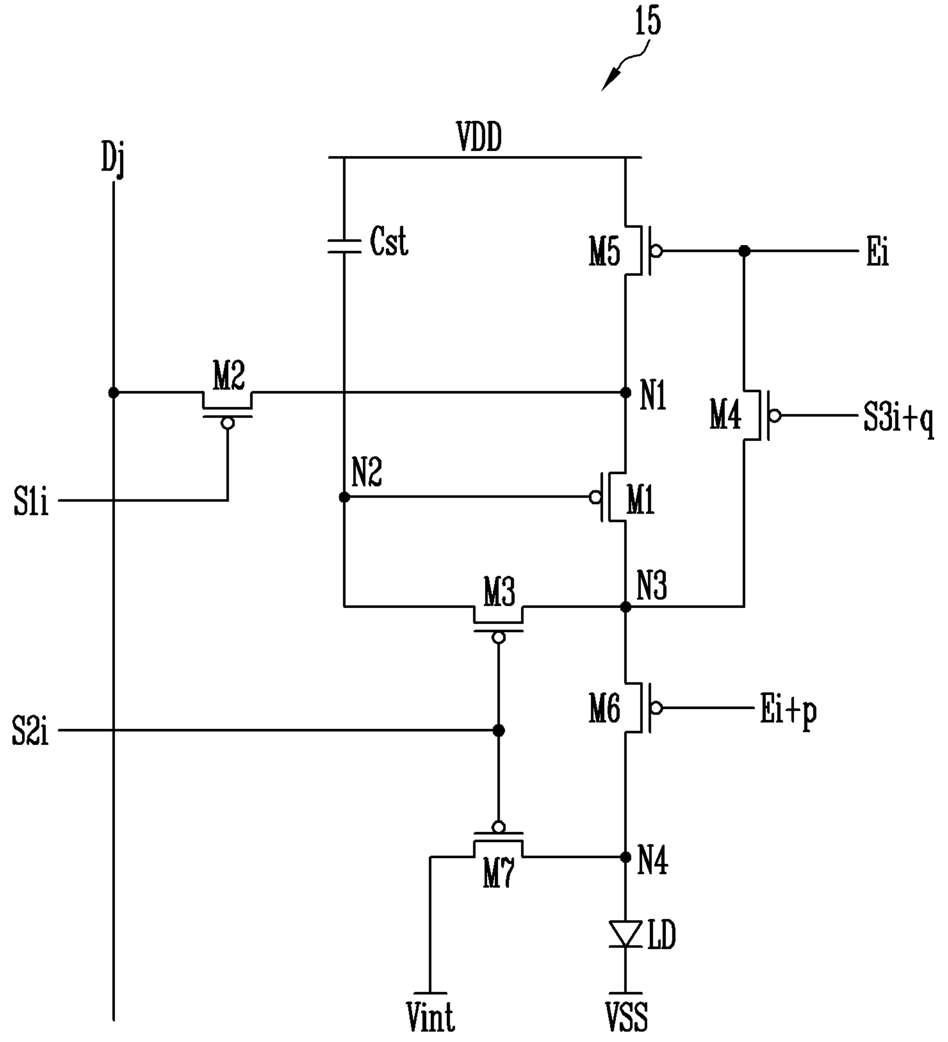
FIGS. 16 to 19 are equivalent circuit diagrams illustrating modifications of the pixel of FIG. 11.

As illustrated in FIG. 16, the fourth transistor M4 of the pixel 15 may supply an emission control signal, as a bias voltage, to the third node N3 (i.e., the drain electrode of the first transistor M1).

Figure 17:
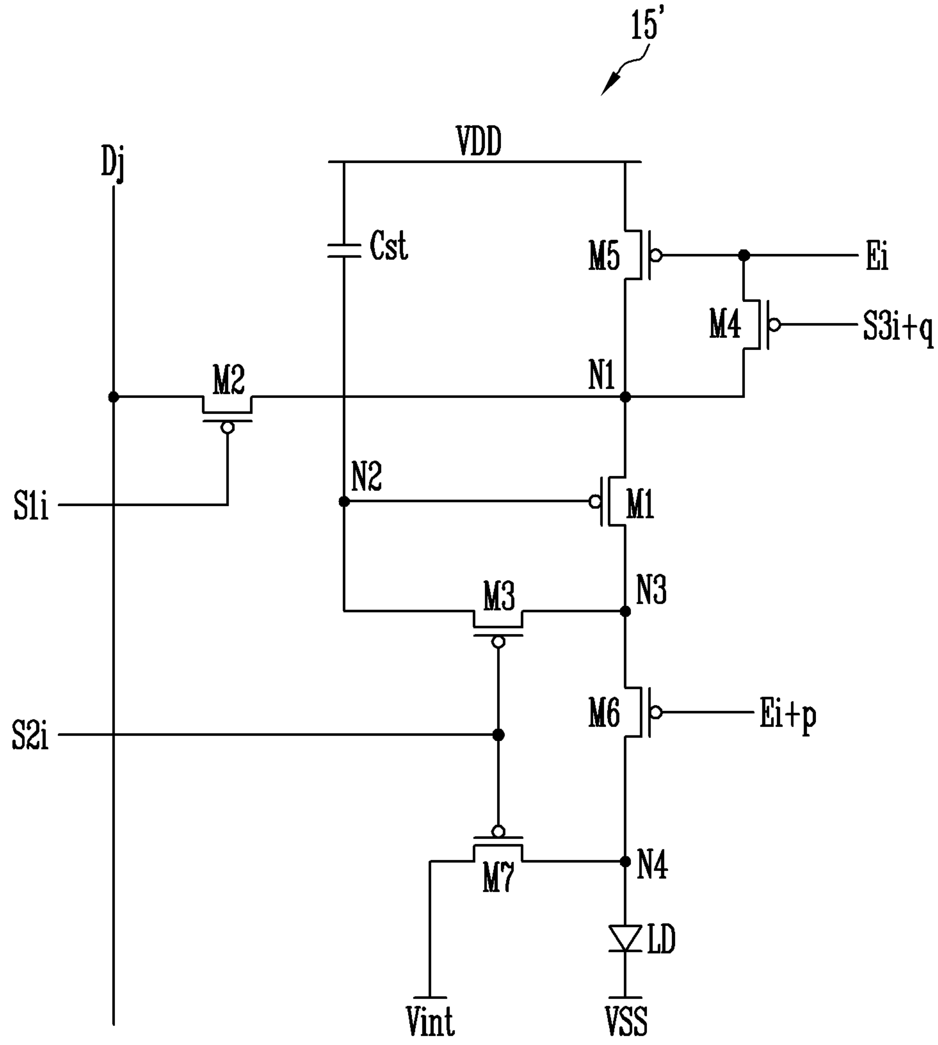

As illustrated in FIG. 17, the fourth transistor M4 of the pixel 15' may supply an emission control signal, as a bias voltage, to the first node N1 (i.e., the source electrode of the first transistor M1).

Figure 18:
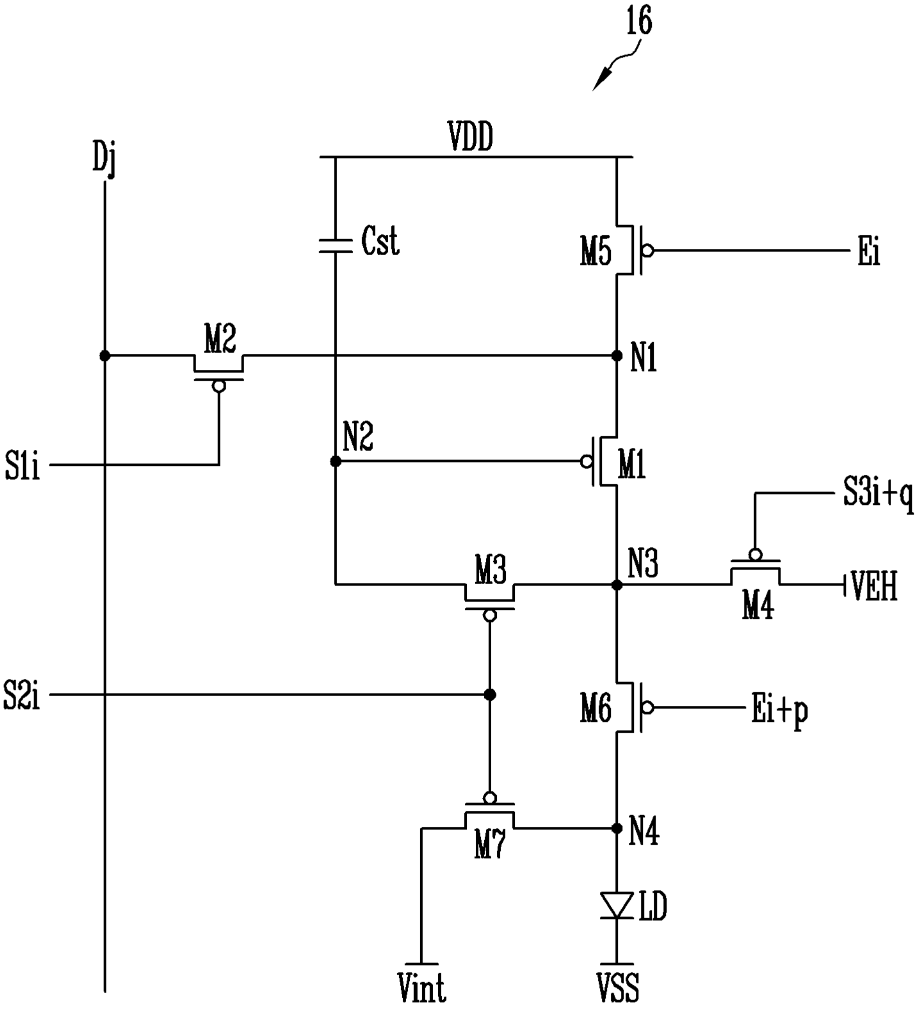

As illustrated in FIG. 18, the fourth transistor M4 of the pixel 16 may supply the voltage of a bias power source VEH, as a bias voltage, to the third node N3 (i.e., the drain electrode of the first transistor M1).

Figure 19:
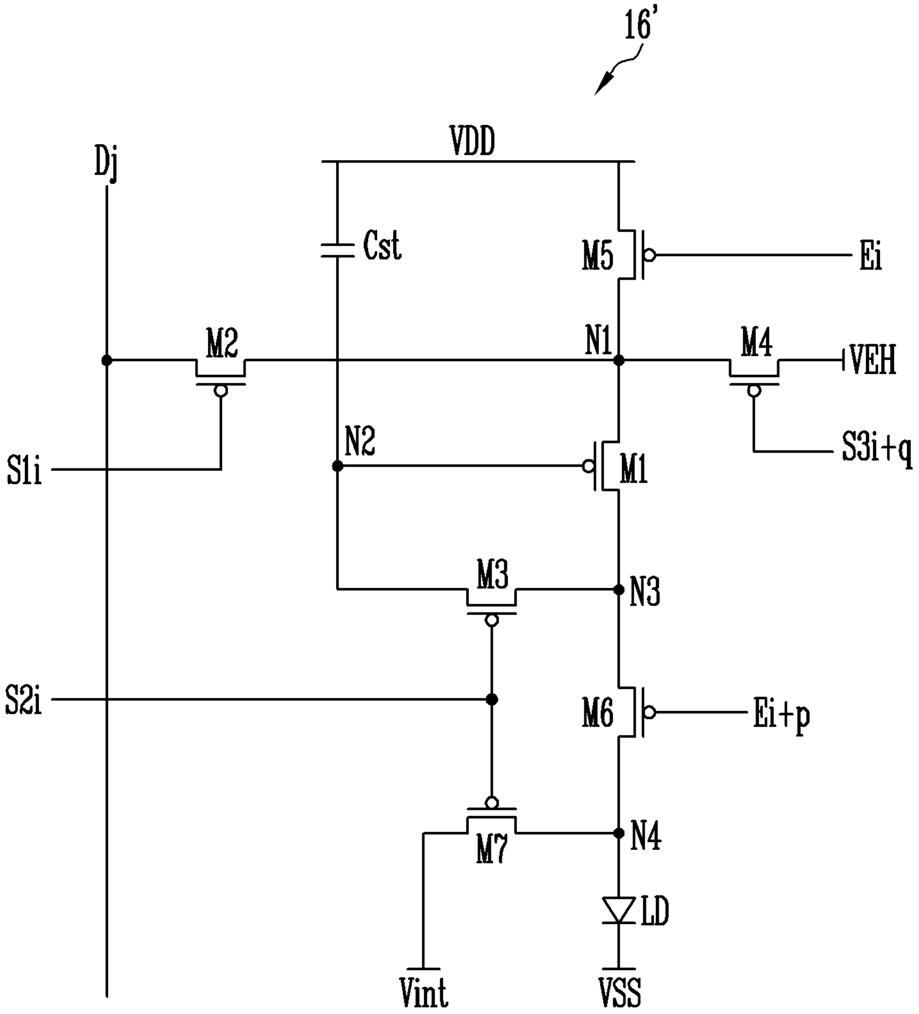

As illustrated in FIG. 19, the fourth transistor M4 of the pixel 16' may supply the voltage of a bias power source VEH, as a bias voltage, to the first node N1 (i.e., the source electrode of the first transistor M1).

As described above, the pixel and the display device having the pixel according to embodiments may support the display of images at various driving frequencies by allowing one display-scan period and at least one self-scan period to be included in one frame. For example, as the driving frequency decreases, the number of self-scan periods may increase, and thus a decrease in luminance and perception of a flicker occurring at low-frequency driving may be improved.

Hysteresis (i.e., the differences between threshold voltage shifts) attributable to an on-bias difference (and a grayscale difference) between adjacent pixels may be overcome by periodically applying a constant bias voltage for on-biasing the first transistor to a first transistor through a fourth transistor regardless of data signals and image grayscale levels. Therefore, a motion blur (i.e., a ghost phenomenon) attributable to hysteresis deviation may be improved (or removed).

However, advantages of the disclosure are not limited to the foregoing advantages, and may be expanded in various forms without departing from the spirit and scope of the disclosure.

What is claimed is:

1. A pixel for a display device, the pixel comprising:

a light-emitting element;

a first transistor including a first electrode electrically connected to a first node, a gate electrode directly connected to a second node, and a second electrode electrically connected to a third node, wherein the first node is electrically connected to a first power source and the third node is electrically connected to the light-emitting element and a first initialization power source;

a second transistor electrically connected between a data line and the first node, the second transistor including a gate electrode electrically connected to a first scan line;

a third transistor electrically connected between the gate electrode of the first transistor and the third node, the third transistor including a gate electrode electrically connected to a third scan line;

a fourth transistor including a gate electrode electrically connected to a second scan line to apply a bias voltage to the first electrode or the second electrode of the first transistor;

a first initialization power source transistor electrically connected between the third node and the first initialization power source; and a second initialization power source transistor electrically connected between the second node and a second initialization power source, wherein the fourth transistor is turned on in a first operation period and one or more second operation periods such that the fourth transistor is turned on at a first frequency, and the second transistor is turned on in the first operation period such that the second transistor is turned on at a second frequency different from the first frequency.

2. The pixel of claim 1, wherein the first transistor is configured to control driving current of the light-emitting element based on a voltage of the second node.

3. The pixel of claim 1, wherein the third transistor is turned on at the second frequency.

4. The pixel of claim 3, wherein a length of a turn-on period of the second transistor and a length of a turn-on period of the third transistor are different from each other.

5. The pixel of claim 3, wherein a first signal is supplied through the first scan line, a second signal is supplied through the third scan line, the second transistor is turned on in response to the first signal enabled in a first time period of the first operation period, the third transistor is turned on in response to the second signal enabled in a second time period of the first operation period, and the second time period overlaps the first time period.

6. The pixel of claim 5, wherein the second time period is greater than the first time period.

7. The pixel of claim 1, further comprising:

a fifth transistor electrically connected between the first power source and the first node; and a sixth transistor electrically connected between the third node and a fourth node, the fourth node electrically connected to a first electrode of the light-emitting element and the first initialization power source transistor.

8. The pixel of claim 7, wherein the fifth transistor includes a gate electrode electrically connected to an emission control line.

9. The pixel of claim 7, wherein the sixth transistor includes a gate electrode electrically connected to an emission control line.

10. The pixel of claim 7, wherein the first initialization power source transistor includes a gate electrode electrically connected to the second scan line.

11. The pixel of claim 7, wherein the second initialization power source transistor includes a gate electrode electrically connected to a fourth scan line.

12. The pixel of claim 7, wherein a storage capacitor electrically connected between the first power source and the second node.

13. The pixel of claim 1, wherein the fourth transistor is electrically connected between an emission control line and the third node, and is configured to apply a voltage of the emission control line, as the bias voltage, to the third node in response to a signal of the second scan line.

14. The pixel of claim 1, wherein the fourth transistor is electrically connected between an emission control line and the first node, and is configured to apply a voltage of the emission control line, as the bias voltage, to the first node in response to a signal of the second scan line.

15. The pixel of claim 1, wherein the fourth transistor is electrically connected between a bias power source and the third node or between the bias power source and the first node, and is configured to apply a voltage of the bias power source, as the bias voltage, to the third node or the first node in response to a signal of the second scan line.

16. The pixel of claim 1, wherein the second frequency is lower than the first frequency.

17. The pixel of claim 1, wherein the second frequency is identical to an image refresh rate and corresponds to an aliquot of the first frequency.

18. The pixel of claim 1, wherein a length of a turn-on period of the second transistor and a length of a turn-on period of the third transistor are different from each other.

19. The pixel of claim 1, wherein the first initialization power source transistor connected to is configured to generate a first initialization power, the second initialization power source is configured to generate a second initialization power, and the first initialization power source is separate from the second initialization power source.

20. A pixel for a display device, the pixel comprising:

a light-emitting element;

a first transistor including a first electrode electrically connected to a first node, a gate electrode directly connected to a second node, and a second electrode electrically connected to a third node, wherein the first node is electrically connected to a first power source and third node is electrically connected to the light-emitting element;

a second transistor electrically connected between a data line and the first node, the second transistor including a gate electrode electrically connected to a first scan line;

a third transistor electrically connected between the gate electrode of the first transistor and the third node, the third transistor including a gate electrode electrically connected to a third scan line; and a fourth transistor including a gate electrode electrically connected to a second scan line to apply a bias voltage to the first electrode or the second electrode of the first transistor, a fifth transistor electrically connected between the first power source and the first node;

a sixth transistor electrically connected between the third node and a fourth node, the fourth node electrically connected to a first electrode of the light-emitting element;

a seventh transistor electrically connected between the fourth node and a first initialization power source; and an eighth transistor electrically connected between the second node and a second initialization power source, wherein the fourth transistor is turned on at a first frequency, the second transistor is turned on at a second frequency different from the first frequency, the fifth to seventh transistors are turned off at the first frequency, and the eighth transistor is turned on at the second frequency.

* * * * *